United States Patent
Scott et al.

(10) Patent No.: US 10,494,878 B2
(45) Date of Patent: Dec. 3, 2019

(54) ASSEMBLY, SYSTEM AND METHOD FOR DIRECTED HIGH-PRESSURE FLUID DELIVERY

(71) Applicants: Doug Scott, Spring, TX (US); John M Jameson, Houston, TX (US)

(72) Inventors: Doug Scott, Spring, TX (US); John M Jameson, Houston, TX (US)

( * ) Notice: Subject to any disclaimer, the term of this patent is extended or adjusted under 35 U.S.C. 154(b) by 0 days.

(21) Appl. No.: 16/000,024

(22) Filed: Jun. 5, 2018

(65) Prior Publication Data

US 2018/0347286 A1    Dec. 6, 2018

Related U.S. Application Data

(60) Provisional application No. 62/672,026, filed on May 15, 2018, provisional application No. 62/515,321, filed on Jun. 5, 2017.

(51) Int. Cl.
| | |
|---|---|
| *E21B 17/02* | (2006.01) |
| *E21B 17/05* | (2006.01) |
| *E21B 33/068* | (2006.01) |
| *E21B 34/02* | (2006.01) |
| *E21B 43/26* | (2006.01) |
| *G05D 7/06* | (2006.01) |

(52) U.S. Cl.
CPC .......... *E21B 17/021* (2013.01); *E21B 17/05* (2013.01); *E21B 34/02* (2013.01); *E21B 43/26* (2013.01); *E21B 33/068* (2013.01); *G05D 7/0623* (2013.01)

(58) Field of Classification Search
CPC ...... E21B 17/021; E21B 17/05; E21B 33/068; E21B 34/02; E21B 43/26
See application file for complete search history.

(56) References Cited

U.S. PATENT DOCUMENTS

| 907,848 | A | * | 12/1908 | Morehouse | ............ | B65G 47/72 |
|---|---|---|---|---|---|---|
| | | | | | | 193/23 |
| 4,133,418 | A | * | 1/1979 | Van Bilderbeek | .... | E21B 23/002 |
| | | | | | | 137/874 |
| 4,159,053 | A | | 6/1979 | Taylor | | |

(Continued)

OTHER PUBLICATIONS

PCT Notification of Transmittal of the International Search Report and the Written Opinion of the International Searching Authority, or the Declaration; dated Aug. 30, 2018; International Application No. PCT/US18/35998; International Searching Authority, United States Patent and Trademark Office.

(Continued)

*Primary Examiner* — Matthew R Buck
(74) *Attorney, Agent, or Firm* — The Compton Law Firm, P.C.; Scott D. Compton

(57) ABSTRACT

The application is directed to a system for conveying fluid to one or more downstream locations including a plurality of downstream locations severally. The system includes one or more upstream fluid sources, a fluid routing system in fluid communication with the one or more upstream fluid sources via an upstream fluid line and each of the downstream locations via separate downstream fluid lines. The fluid routing system includes fluid connections corresponding to each of the downstream fluid lines and is operationally configured to fluidly connect with a particular fluid connection while remaining fluidly disconnected from the remaining fluid connections.

19 Claims, 17 Drawing Sheets

(56) References Cited

U.S. PATENT DOCUMENTS

| | | | | |
|---|---|---|---|---|
| 4,223,700 A * | 9/1980 | Jones | ............... | B65G 53/56 |
| | | | | 137/625.46 |
| 4,291,724 A * | 9/1981 | Miller | ............... | B65G 51/24 |
| | | | | 137/555 |
| 4,366,839 A * | 1/1983 | Slavin | ............... | G03D 3/06 |
| | | | | 137/625.11 |
| 6,050,299 A | 4/2000 | Abrams | | |
| 6,074,136 A | 6/2000 | Steele | | |
| 6,098,646 A * | 8/2000 | Hennemann | ............... | A47L 15/44 |
| | | | | 137/101.19 |
| 8,839,867 B2 | 9/2014 | Conrad | | |
| 9,909,386 B2 * | 3/2018 | McEvoy | ............... | E21B 34/02 |
| 2005/0236049 A1 | 10/2005 | Manson | | |
| 2011/0048695 A1 | 3/2011 | Cherewyk et al. | | |
| 2014/0352968 A1 | 12/2014 | Pitcher et al. | | |
| 2015/0292297 A1 | 10/2015 | Kajaria et al. | | |
| 2017/0122060 A1 | 5/2017 | Dille et al. | | |
| 2017/0123437 A1 | 5/2017 | Boyd et al. | | |
| 2017/0130555 A1 | 5/2017 | Kajaria et al. | | |
| 2017/0130885 A1 | 5/2017 | Arizpe et al. | | |

OTHER PUBLICATIONS

Scott et al., Claims 1-15 of International Application No. PCT/US18/35998, Jun. 5, 2018.

* cited by examiner

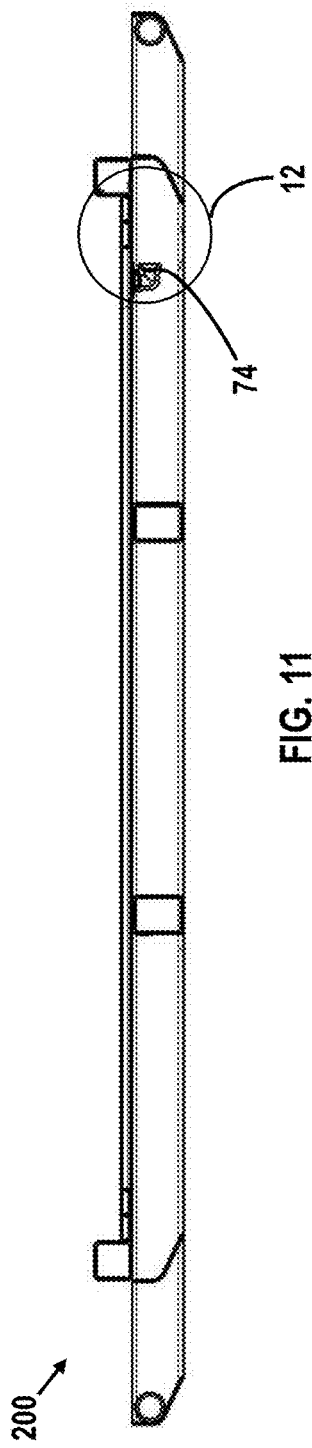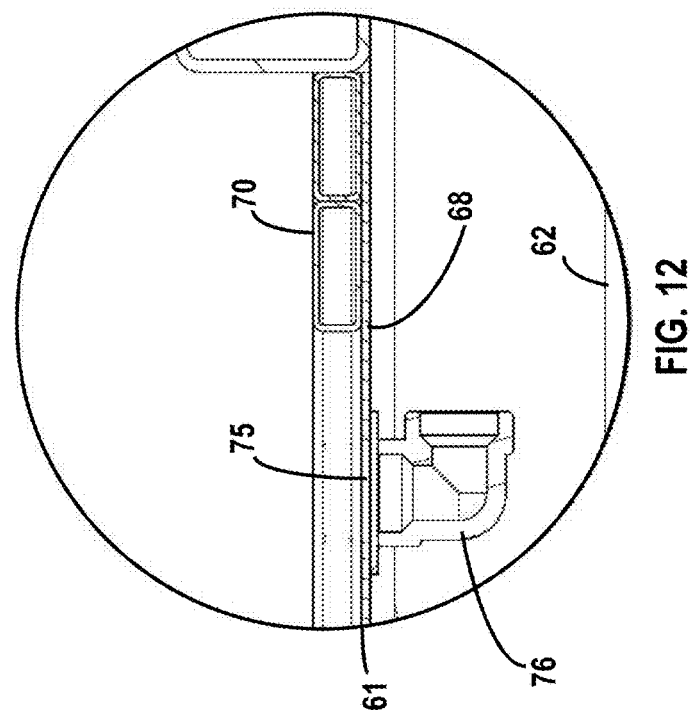

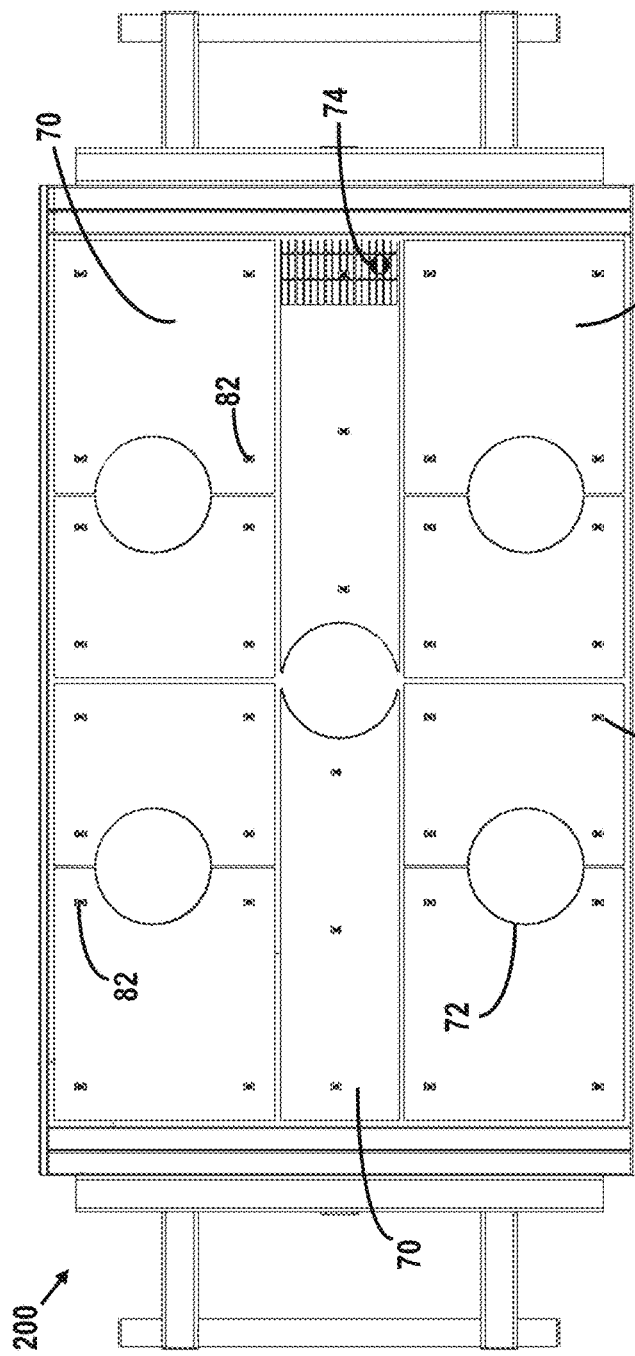
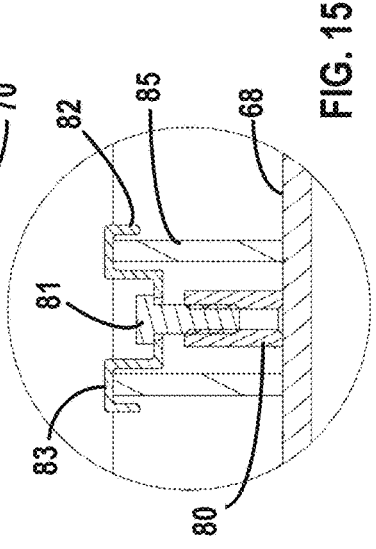
FIG. 13
FIG. 14
FIG. 15

ASSEMBLY, SYSTEM AND METHOD FOR DIRECTED HIGH-PRESSURE FLUID DELIVERY

CROSS-REFERENCE TO RELATED APPLICATIONS

This application claims benefit of U.S. Provisional Patent Application Ser. No. 62/515,321 filed on Jun. 5, 2017, the content of which is hereby incorporated by reference in its entirety. This application also claims benefit of U.S. Provisional Patent Application Ser. No. 62/672,026, filed on May 15, 2018, the content of which is hereby incorporated by reference in its entirety.

STATEMENT REGARDING FEDERALLY SPONSORED RESEARCH OR DEVELOPMENT

Not applicable.

BACKGROUND OF THE APPLICATION

Various operations require the controlled delivery of fluid such as high-pressure fluid through multiple lines. One such operation includes the hydraulic fracturing of subterranean formations at a multi-well site pad. Hydraulic fracturing is the process of injecting fluid into a wellbore at a high-pressure in order to fracture rock formations to facilitate release of trapped hydrocarbons within the formation. Hydraulic fracturing typically requires a high volume of fracturing fluid to be pumped to subterranean formations at high velocities and pressures to fracture the subterranean formation. Fracking operations typically use a manifold or manifold trailer comprised of a piping system that provides pressurized fluid to one or more wellheads at the surface of the pad. In typical operation, a low pressure side of the manifold piping system receives low pressure fluid from a tank or other source(s) and routes the fluid to a plurality of pumps where the fluid is pressurized to a high-pressure (e.g., up to about 20,000 pounds per square inch). The pumps return the pressurized fluid to a high-pressure side of the manifold piping system for routing the pressurized fluid to one or more wellheads.

Regarding multi-well completion, a method called "zipper fracking" or "zip fracking" is often employed to reduce costs and time by completing adjacent wells on a multi-well pad in a back and forth manner. Sequential operation allow for stimulation operations to proceed on one subterranean formation point, while preparing an adjacent subterranean formation(s) for stimulation. As understood by the skilled artisan, a single high-pressure fracturing pump is not typically capable of providing a sufficient volume of fluid at the requisite pressure in order to fracture a well. To overcome such deficiency the output of multiple high-pressure fracturing pumps is combined in a manifold termed a "missile," which in turn passes the fluid to what is called a "zipper manifold," which is operationally configured to allow fluid(s) and pressure to be directed to the appropriate subterranean formation while preventing fluid(s) and pressure access to other subterranean formation(s). Said another way, a zipper manifold directs pressurized fluid to a desired well by closing off fluid access to the remaining wells in a multi-well pad. In particular, a zipper manifold is comprised of a series of valves that may be opened and closed as necessary to control the flow of pressurized fluid to a particular well while sealing the remaining wells from such pressurized fluid flow.

A zipper manifold is typically located between the missile and what is commonly referred to as a "Christmas tree" or "frac stack," which is a fluid connection with an assortment of valves and controls located above the opening of a particular wellbore with a pressure rating to accommodate the high flow rates and pressures for hydraulic fracturing. A plurality of dedicated high-pressure fluid supply lines fluidly communicate the zipper manifold to a plurality of wells with one supply line being connected to a single frac stack of each well. Unfortunately, a zipper manifold is typically located near the missile, which is often a good distance from one or more of the wells. Such layout often increases the amount of frac iron required for zipper fracking operations and the frac iron often becomes quite muddled. In addition, the many turns and bends in the frac iron may lead to inefficiencies and often require couplings and fittings that add possible failure points to the frac iron. Such may lead to increased fluid velocity creating turbulence and in instances where fluids are transporting proppants such may have an abrasive effect on a zipper manifold. In addition, a zipper manifold typically includes a series of large and consequently expensive valves including one or more open valves for directing high-pressure fracturing fluid ("fracturing fluid") to a subterranean formation and one or more closed valves to shut off adjacent subterranean formation(s) from exposure to high-pressure fluid. The opening and closing of valves to direct and isolate the flow of fracturing fluid may be conducted many times until all subterranean formation points have been stimulated. However, the repeated opening and closing of valves may lead to valve failure over time. Also, there is the risk that one or more valves may be left open during routine opening and closing of valves thereby pressurizing a portion of the frac iron that an operator intended to be depressurized. Such valves are also routinely lubricated requiring fracturing operations to cease during the lubrication process.

Overcoming the above mentioned shortcomings is desired.

BRIEF SUMMARY OF THE INVENTION

The present application is directed to a system for routing fluid to a plurality of target locations, including (1) a fluid inlet assembly for receiving fluid from one or more upstream sources; and (2) a fluid outlet assembly including a plurality of fluid outlet connections wherein each fluid outlet connection is fluidly communicated with a different target location; wherein the fluid inlet assembly is moveable between a disengaged position separated from each of the fluid outlet connections and an engaged position fluidly connected to one of the fluid outlet connections while remaining in the disengaged position regarding the other fluid outlet connections.

The present application is also directed to a fluid delivery system, including (1) an upstream fluid source; (2) a plurality of downstream target fluid delivery locations; and (3) a fluid routing system having a fluid inlet in fluid communication with the upstream fluid source and a plurality of fluid outlets in fluid communication with the plurality of downstream target fluid delivery locations, each fluid outlet corresponding to a different downstream target fluid delivery locations; the fluid routing system having a swiveling fluid conduit operationally configured to be directed between a disengagement position wherein the swiveling fluid conduit is disconnected from each of the fluid outlets and an engagement position wherein the swiveling fluid conduit is connected to a target fluid outlet in a manner effective for fluid flow from the upstream fluid source to a downstream target fluid delivery location corresponding to the target fluid outlet.

The present application is also directed to a single line hydraulic fracturing system for stimulating a plurality of wells of a multi-well site, including (1) an upstream fluid line in fluid communication with a source of high-pressure fluid; (2) a plurality of downstream fluid lines, each downstream fluid line corresponding to a particular well; and (3) a fluid routing system in fluid communication with (a) the upstream fluid line and (b) the plurality of downstream fluid lines; the fluid routing system having a plurality of fluid outlets, each fluid outlet being fluidly communicated with a different downstream fluid line; and the fluid routing system having a swiveling fluid line for selective fluid communication with one of the plurality of fluid outlets for routing high-pressure fluid to a single well.

BRIEF DESCRIPTION OF THE SEVERAL VIEWS OF THE DRAWING

FIG. 11 is a side view of the first support member of FIG. 10.

FIG. 12 is a side view of a drain of the first support member of FIG. 11.

FIG. 13 is a top view of the first support member of FIG. 10.

FIG. 14 is a top view of a fastener assembly of the first support member of FIG. 13.

FIG. 15 is a side view of the fastener assembly of FIG. 14.

DETAILED DESCRIPTION

Figure 1:
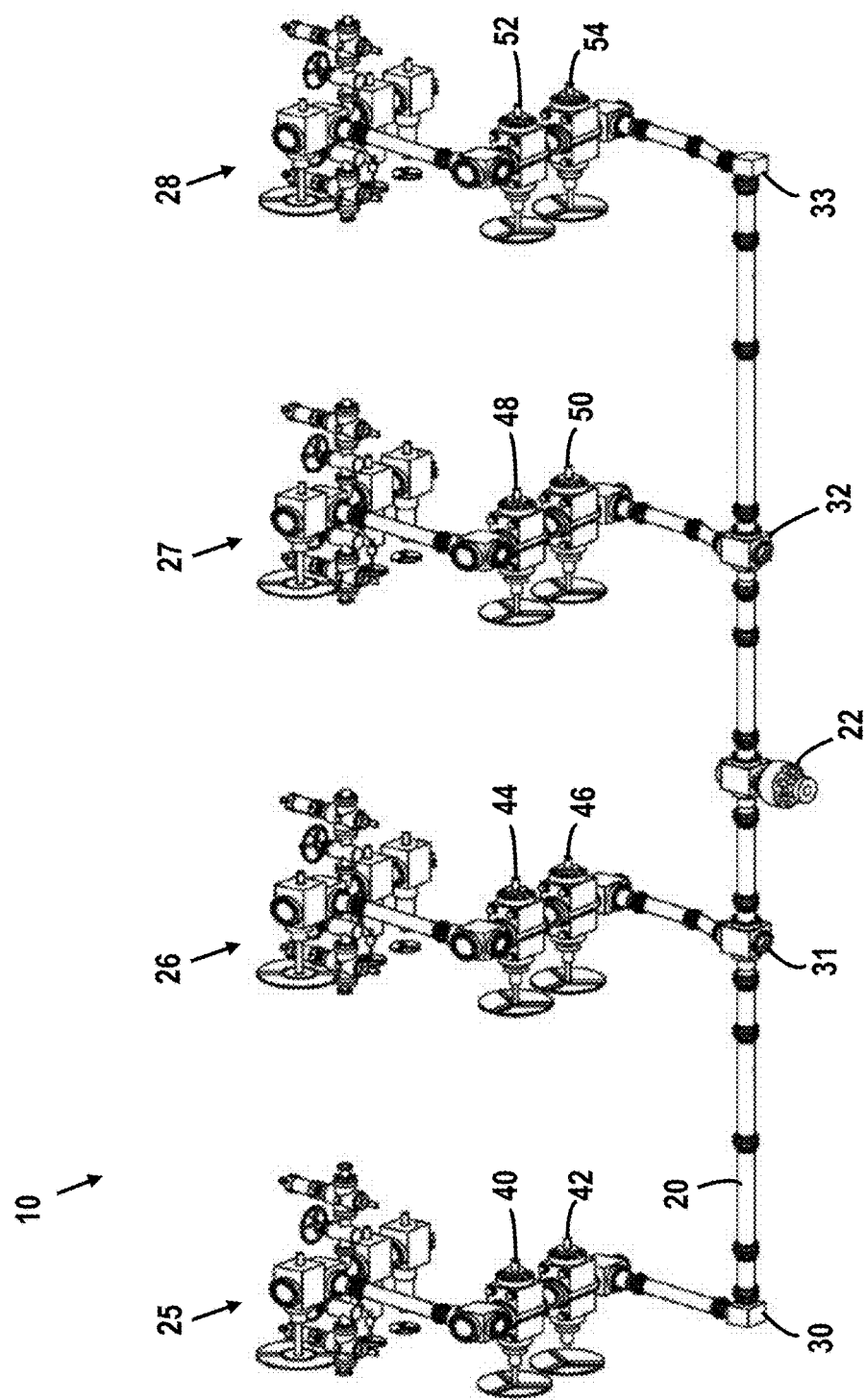
FIG. 1 illustrates a prior art system used for hydraulic fracturing of a multi-well pad.

Before describing the invention in detail, it is to be understood that the present invention is not limited to particular embodiments. It is also to be understood that the terminology used herein is for the purpose of describing particular embodiments only and is not intended to be limiting.

Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value. As used in this specification and claim(s), the term "about" is defined as being close to as understood by one of ordinary skill in the art, and in one non-limiting embodiment the term may be defined to be within 10%, suitably within 5%, more suitably within 1%, and most suitably within 0.5% of a particular numerical value. The terms "first," "second," and the like, herein do not denote any order, quantity, or importance, but rather are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be", or "can" or "can be."

As used in this specification and the appended claims, the phrase "hydraulic fracturing" and "fracking" may be used interchangeably. The phrases "zipper fracking," "zip fracking," and "zip frac operations" and like phrases may be used interchangeably. Generally, the term "frac iron" refers to the temporary surface piping, valves, and manifolds necessary to deliver a fluid treatment to the wellbore from the mixing and pumping equipment. The phrase "pad drilling" refers to the practice of drilling multiple wellbores from a single surface location. The phrase "trailer or skid mounted hydraulic fracturing fluid pumping unit" may be used interchangeably with phrases such as "hydraulic fluid delivery unit," "transportable pumping unit," "fracturing pump" and "frac pump." The acronym "NPT" refers to American National Standard Pipe Thread standards as understood by persons of ordinary skill in the art.

The invention of the present application increases reliability, operational function and decreases or even eliminates transition time. In reference to the prior art hydraulic fracturing technique discussed above, "transition time" is the time that is required to actuate the valves that shut off fluid flow from one well and transitions the fluid flow to another well during fracking operations. An additional advantage of the present invention is that only a single fluid line is pressurized at a time so that wireline, greasing, or other intervention work may be performed while the non-accessed wells are off line. Also, by significantly reducing the number of valves the time consuming maintenance required by valves is eliminated.

Set forth below are certain aspects of some embodiments of the invention. It should be understood that these aspects are presented merely to provide the reader with a brief summary of certain forms the invention may take and that these aspects are not intended to limit the scope of the invention. Indeed, the invention may encompass a variety of aspects that may not be set forth below.

It has been found that it is possible to replace known frac iron set-ups including zipper manifolds and associated valves with a main fluid routing system such as a centralized fluid routing system, fluid flow control system or quick connect system operationally configured to reduce fracturing equipment costs and reduce the amount of time required to fracture a multi-well pad by eliminating time intensive maintenance operations common to zipper manifolds.

In one aspect, the application is directed to the delivery of high-pressure fluid through a single high-pressure fluid line to a system operationally configured to convey high-pressure fluid to a plurality of downstream independent high-pressure fluid lines sequentially or non-sequentially by pressurizing a single fluid line while completely eliminating the possibility of high-pressure fluid flowing to the remaining fluid lines.

In another aspect, the application is directed to improved hydraulic fracturing operations employing a fluid routing system operationally configured to simultaneously direct high-pressure fracturing fluid to a first well of a multi-well pad and isolate the remaining wells from fluid flow during fracturing operations of the first well.

The present application is also directed to a method of directing fluid from one or more upstream sources to one or more downstream locations including, but not necessarily limited to directing high-pressure fluid to a single well of a multi-well pad while simultaneously isolating the remaining wells from high-pressure fluid flow by fluidly disconnecting the remaining wells from the source of high-pressure fluid.

In another aspect, the application provides a fluid routing system for routing fluid from one or more upstream locations to a plurality of downstream locations. Suitably, the fluid routing system includes a plurality of fluid outlets, each fluid outlet corresponding to a different downstream location. During operation, the fluid routing system is operationally configured to isolate the flow of fluid to a single downstream location while simultaneously mechanically disconnecting the remaining fluid outlets.

In another aspect, the application provides a system for receiving high-pressure, the system including a work station with a centrally located fluid inlet assembly operationally configured to dispense high-pressure fluid out radially from the fluid inlet 360.0 degrees.

In another aspect, the application provides a portable or transportable fluid routing system or fluid delivery system that may be assembled at a particular work site or assembled and transported to a particular work site.

In another aspect, the application provides a portable or transportable system operationally configured to receive fluid at a central point of the system and divert fluid flow in the horizontal and vertical directions as well as route fluid out radially from the central point.

In another aspect, the application provides a system operationally configured to receive upstream fluid and route the fluid to one of a plurality of downstream locations by being mechanically and fluidly connected to a target fluid line of a particular downstream location and mechanically and fluidly disconnected from the fluid lines of the remaining downstream locations. In other words, the fluid lines of the remaining downstream locations are mechanically and fluidly disconnected by virtue of the connection to the target fluid line.

In another aspect, the application provides a single line multi-well hydraulic fracturing system comprising (1) a pump fluid input line; (2) a rotating joint in fluid communication with the pump fluid input line having a swiveling well selection pipe such that the swiveling well selection pipe swivels around the rotating joint; (3) a first input connection and at least (4) a second input connection located around the rotating joint at a distance allowing the swiveling well selection pipe to sequentially allow fluid communication between either the first input connection and the rotating joint or the second input connection and the rotating joint; (5) a first tubular in fluid communication with the first input connection and (6) a first fracturing tree and (7) a second tubular in fluid communication with the second input connection and (8) a second fracturing tree. In this implementation, the system further comprises at least one frac pump in fluid communication with the pump fluid input line. In this implementation, the first fracturing tree comprises a rotatable portion located above an upper master valve of the fracturing tree.

In another aspect, the application provides a method, apparatus, and system for single line fracturing of one or more wells in a multi-well pad. The method, apparatus, and system include a swiveling well selection pipe operationally configured to connect individually to each tree in a multi-well pad without the use of a manifold.

The fluid routing system of this application is operationally configured to isolate the flow of fracturing fluid to a single frack stack of a first well and thereafter quickly change the flow of fracturing fluid from the first well to a second well. The fluid routing system may deliver fracturing fluid through a single or multi-line configuration and may employ rotational adjustments that allow for height, width and length manipulation. In one embodiment, the fluid routing system may consist of valves, elbow and tee blocks, and spool pieces. Suitable valves may be plug, gate, or other types of valves as desired. In one embodiment, the fluid routing system may be skid mounted or trailer mounted for ease of transport and deployment. In another embodiment, the fluid routing system may be of permanent installation. The fluid routing system may be used on multi-well pads and single well pads. The fluid routing system is functional for all processes normally performed during the well completion process including but not limited to fracturing, acidizing, miscellaneous stimulation techniques and pump down perforating. In regard to hydraulic fracturing operations, an advantageous focus of the present invention is to minimize pressure control equipment, minimize overall footprint, minimize piping, eliminate the need of zipper manifolds and equivalent, and minimize the number of valves on a well site completion location.

FIG. 1 depicts an exemplary prior art multi-well fracturing system 10 as described above employing a zipper manifold 20. As shown, a known zipper manifold 20 includes a fluid inlet head 22 for receiving high-pressure fluid from a missile (not shown) and fluid conduit fluidly connecting the inlet head 22 to multiple trees or frac trees 25-28 of the various wellbores—a total of four wellbores as shown. In this illustration, the zipper manifold 20 includes four outputs 30-33, one corresponding to each tree 25-28, each output 30-33 being fluidly communicated to the inlet head 22 via fluid conduit 35. As shown, each output 30-33 of this system is provided with two valves for cutting off fluid flow from the zipper manifold 20 to the frac trees 25-28. For example, valves 40 and 42 are operationally configured to control or prevent fluid flow between a first output 30 and tree 25. Valves 44 and 46 are operationally configured to control or prevent fluid flow between a second output 31 and tree 26. Valves 48 and 50 are operationally configured to control or prevent fluid flow between a third output 32 and tree 27. Valves 52 and 54 are operationally configured to control or prevent fluid flow between a fourth output 33 and tree 28. By opening or closing the various valves fracturing fluid may be directed to a desired tree and wellbore while sealing off the remaining three wells from receiving fluid from the zipper manifold 20 via one or more valves. As discussed below, the invention of the present application provides a novel approach to controlling fluid flow to downstream locations.

Figure 2:
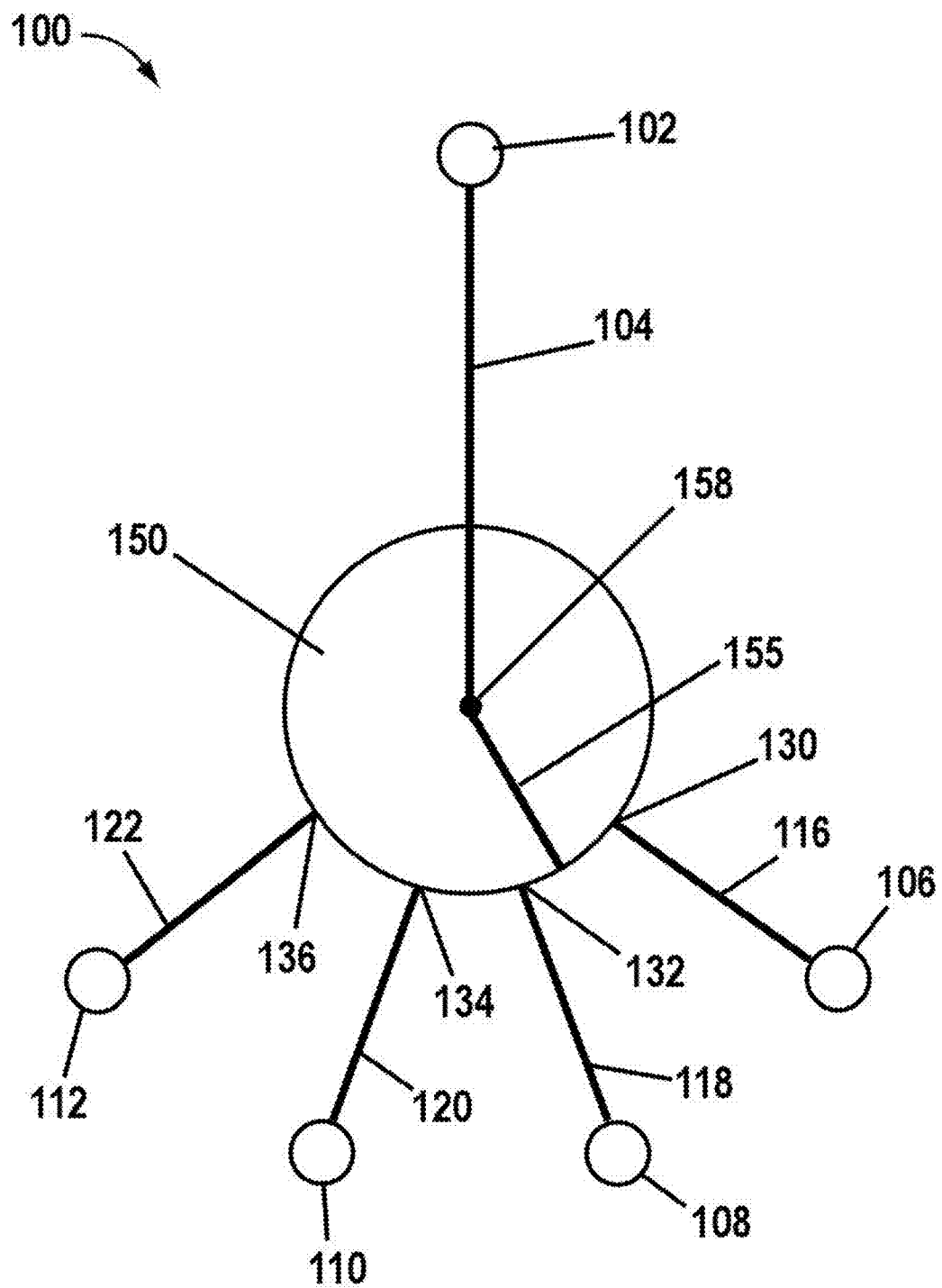
FIG. 2 is a simplified illustration of the system of this application.

One simplified illustration of the present system 100 is provided in FIG. 2. As shown, the system 100 includes (1) one or more upstream fluid sources 102, (2) one or more fluid input lines in fluid communication with the one or more upstream fluid sources 102, (3) at least one fluid routing assembly or fluid routing system (also referred to herein as a quick connect assembly or "quick connect system 150") including a fluid inlet assembly in fluid communication with the one or more fluid input lines 104, (3) one or more downstream fluid target locations 106, 108, 110 and 112 and (4) corresponding downstream fluid lines 116, 118, 120 and 122 for fluidly communicating the quick connect system 150 with the downstream fluid target locations 106, 108, 110 and 112. As described herein, the quick connect system 150 is operationally configured to receive fluid from the one or more upstream fluid sources 102 and route the fluid to the one or more downstream fluid target locations 106, 108, 110 and 112 via the fluid inlet assembly in an isolated sequential or non-sequential manner. Even though the quick connect system 150 is operable with a single downstream fluid target location, the quick connect system 150 is particularly advantageous for use with a plurality of downstream fluid target locations 106, 108, 110 and 112 as shown in FIG. 2. In particular, the quick connect system 150 is operationally configured to fluidly connect to a particular downstream fluid target location, receive fluid, e.g., low pressure fluid and/or high-pressure fluid, from the one or more upstream fluid sources 102 and route the fluid to the particular downstream fluid target location while simultaneously maintaining the remaining downstream target locations fluidly disconnected from the fluid inlet assembly. In other words, the remaining downstream fluid target locations are completely detached or cut off from the one or more fluid input lines 104 and one or more upstream fluid sources 102.

In an embodiment of the system 100 for hydraulic fracturing operations at a multi-well site, the upstream fluid source 102 may include a fracturing fluid supply provided by one or more frac pumps that pump the fluid to the quick connect system 150 via the fluid input line 104. In another embodiment, the fracturing fluid supply may include a reservoir from which fluid may be pumped into the fluid input line 104. Other suitable sources of fracturing fluid and modes for transmitting such fluid to the quick connect system 150 are herein contemplated for use. Although not limited to any particular distance, in hydraulic fracturing operations, in order to minimize the footprint at a particular well site as well as minimize operating costs, a quick connection system 150 is suitably located a distance from an upstream fluid source 102 of about 30.48 meters (100.0 feet) down to a minimum distance of about 1.8 meters (6.0 feet). Likewise, the quick connection system 150 is suitably located a distance from downstream fluid target locations 106, 108, 110 and 112 of about 30.48 meters (100.0 feet) down to a minimum distance of about 1.8 meters (6.0 feet). As understood by the skilled artisan, one or more of the downstream fluid target locations 106, 108, 110 and 112 may be located a distance from the quick connection system 150 different than other downstream fluid target locations. Similarly, in an embodiment of the system 100 including multiple upstream fluid sources 102, one or more upstream fluid sources may be located a distance from the quick connection system 150 different than other upstream fluid sources.

Still referring to FIG. 2, the quick connection system 150 includes one or more fluid connections 130, 132, 134, 136 corresponding to each of the downstream fluid lines 116, 118, 120, 122 and corresponding downstream fluid target locations 106, 108, 110 and 112 wherein each of the fluid connections 130, 132, 134, 136 is operationally configured to route fluid received from the fluid input line 104 to its corresponding downstream fluid lines 116, 118, 120, 122. In one suitable embodiment, each of the fluid connections 130, 132, 134, 136 may be located along an arc and the fluid inlet assembly of the quick connect system 150 may include a swivel joint providing a swiveling fluid conduit or turnable fluid conduit (hereafter "swing arm 155") operationally configured to fluidly communicate with each of the fluid connections 130, 132, 134, 136 in isolation. In one embodiment, the fluid inlet assembly may also include a swivel type coupling (hereafter "swivel connector 158") providing a pivot point for a fixed length swing arm 155 up to 360.0 degrees. As understood by the skilled artisan, by being disposed along an arc the fluid connections 130, 132, 134, 136 are equidistant from the swivel connector 158. As such, when the swing arm 155 is fluidly communicated with a particular fluid connection, e.g., fluid connection 130, the remaining fluid connections 132, 134 and 136 are necessarily mechanically disconnected, and thus fluidly disconnected, i.e., completely cut off from the swing arm 155, whereby the risk of pressurization of the non-operating target locations, e.g., target locations 108, 110 and 112 is completely eliminated.

In regard to hydraulic fracturing operations of a multi-well site, the quick connect system 150 allows wells to be fractured individually resulting in a single "live" well for fracturing, while the remaining wells are rendered "dead" or "inactive" by fluidly disconnecting the remaining wells from the fluid inlet assembly as a result of the isolated pairing of the swing arm 155 with one of the fluid connections 130, 132, 134, 136. Although the quick connect system 150 will be discussed in terms of a swing arm 155 having a fixed length, in another embodiment, a swing arm 155 may be provided as adjustable in length for fluidly communicating with fluid connections 130, 132, 134, 136 located unequal distances from the swivel connector 158. In still another embodiment, and depending on the system 100 operation at hand, the swing arm 155 may be replaced with a flexible fluid conduit operationally configured to fluidly communicate with each of the fluid connections 130, 132, 134, 136 without the necessity of turning action of a swivel connector 158. Such flexible fluid conduit may be suitable for use as part of a low pressure system 100 for the routing of low pressure fluid, e.g., routing waste water, farm irrigation, and the like.

Figure 3:
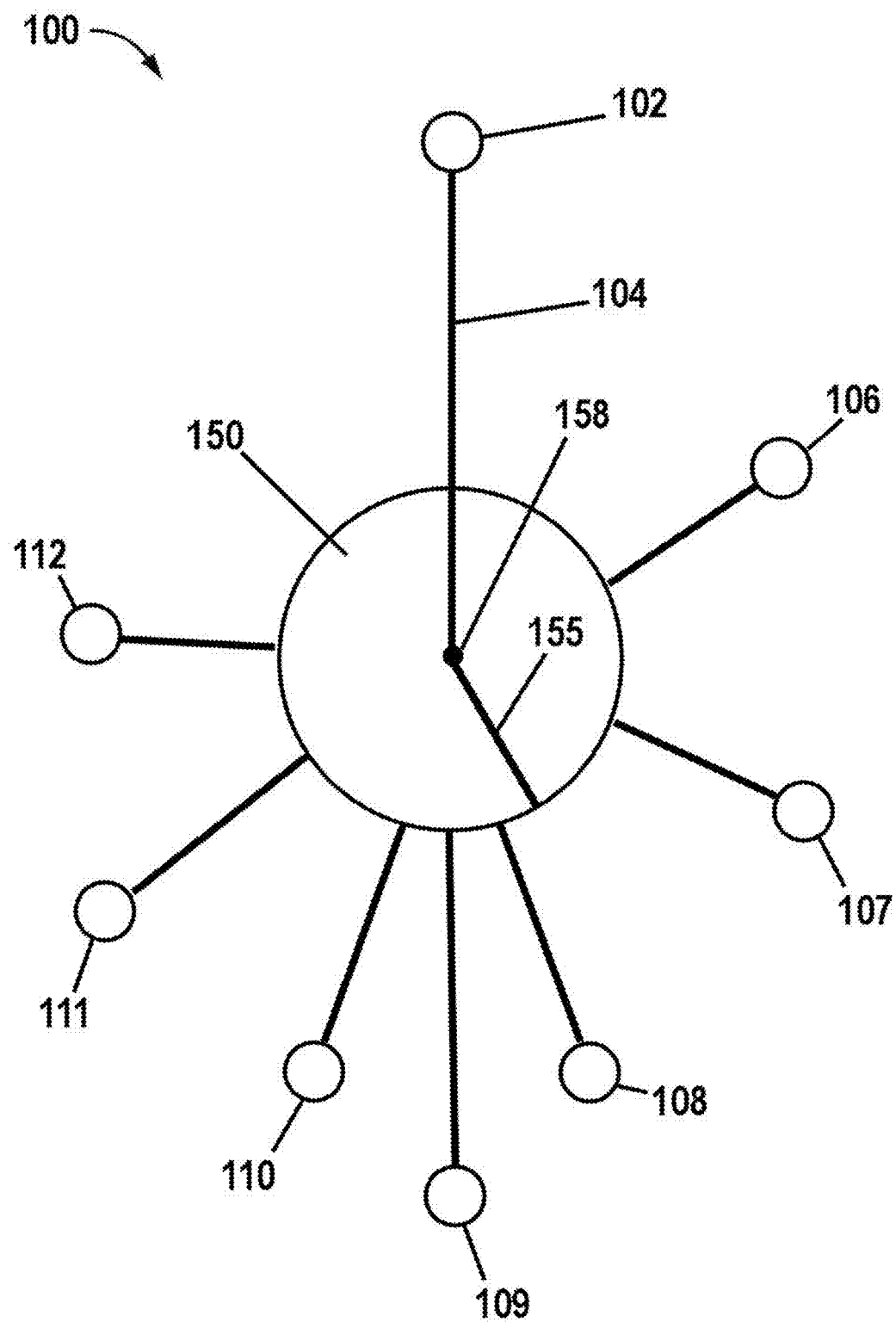
FIG. 3 is another simplified illustration of the system of this application.

Further, the system 100 is not limited to any particular number and/or type(s) of downstream fluid target locations. As shown, downstream fluid target locations can be arranged or otherwise situated in various layouts, including linear and non-linear layouts. And although the quick connect system 150 may be used with a single downstream target location, in a particularly advantageous embodiment, the system 100 suitably includes two or more downstream target locations as shown in FIG. 2 and also FIG. 3, which is a simplified example depicting a total of seven (7) downstream fluid target locations 106-112. Likewise, the system 100 may be built to scale to handle a particular maximum fluid volume at a particular maximum flow rate. As such, the system 100 is not limited to any particular number or type of upstream fluid sources 102. In another embodiment of the system 100, the one or more downstream target locations and/or upstream fluid sources may be altered in number and/or type as desired or as otherwise may be required pursuant to a particular operation.

As stated, the quick connect system 150 is operationally configured to isolate the flow of fluid to a single downstream fluid line from amongst a plurality of downstream fluid lines. As described below, the inclusion of a quick connect system 150 having a movable swing arm 155 easily attachable and detachable to/from a particular downstream fluid line, e.g., fluid line 116, connotes complete mechanical and fluid disconnection of the remaining downstream fluid lines 118, 120, 122 from (1) the quick connect system 150 and (2) the one or more upstream fluid sources 102 by virtue of the connection between the swing arm 155 and fluid line 116. Although the system 100 may be employed for a plurality of operations, the discussion below will focus in part on hydraulic fracturing operations of a multi-well pad using high-pressure fluid.

Figure 4:
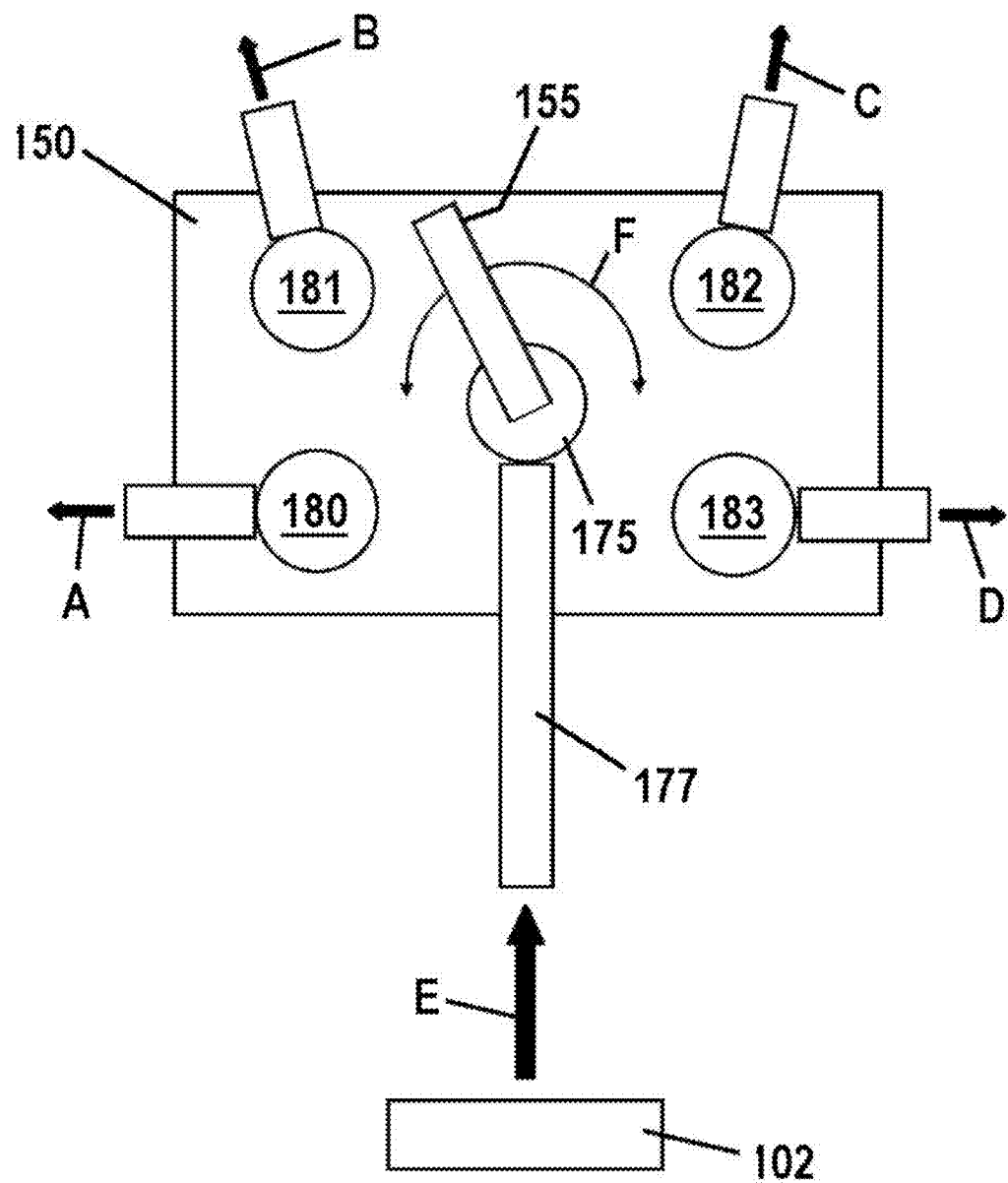
FIG. 4 is a simplified top view of a quick connect system of this application.

With attention to FIG. 4, one simplified illustration of a quick connect system 150 of this application includes an operating surface or work platform defined by a fluid inlet assembly and a fluid outlet assembly comprised of one or more fluid outlets or fluid outlet connections or "fluid outlet members" operationally configured to receive fluid from the fluid inlet assembly and convey the fluid to downstream fluid target locations corresponding to each of the fluid output members (see the fluid flow directional Arrows A-D). As shown in the example of FIG. 4, the quick connect system 150 includes a fluid inlet assembly with a centrally located fluid inlet member 175 and four fluid outlet members, namely, first fluid outlet member 180, second fluid outlet member 181, third fluid outlet member 182, and fourth fluid outlet member 183, each outlet member being fluidly communicable with a distinct downstream fluid target location. The fluid inlet assembly also includes a trunk line or "fluid inlet connector 177" or "connector 177" in fluid communication with the fluid inlet member 175 for receiving fluid from one or more upstream fluid sources 102 (see fluid flow directional Arrow E). The fluid inlet assembly also includes a swing arm 155 in fluid communication with the fluid inlet member 175 operationally configured to be fluidly communicated with each of the fluid output members 180-183 (see Arrow F) in an isolated manner effective to regulate the flow of fluid received through the connector 177 through a single fluid outlet member to a single downstream fluid target location.

Figure 5:
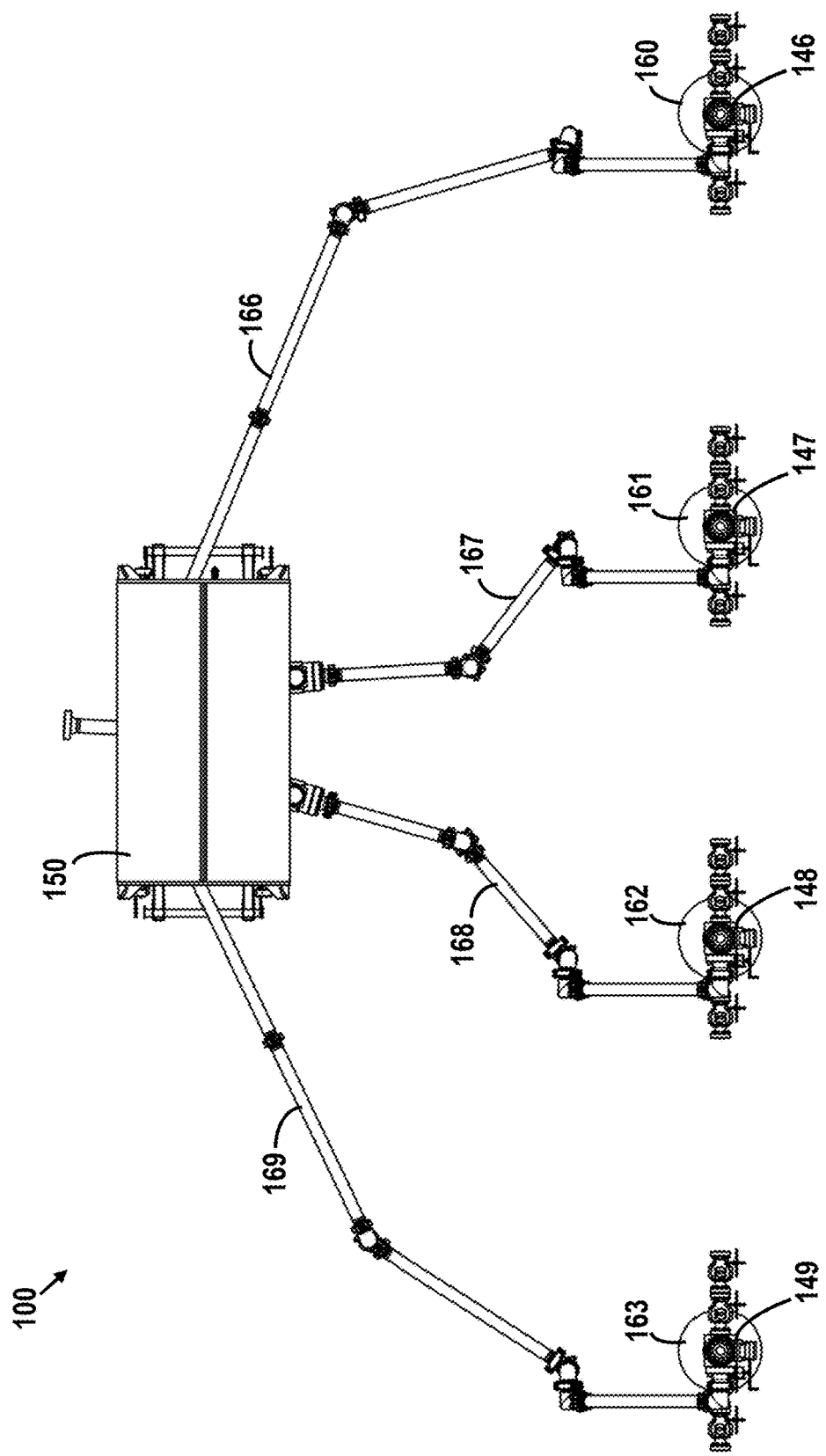
FIG. 5 is a top view of an embodiment of the system of this application for hydraulic fracturing operations.

A simplified embodiment of the system 100 for hydraulic fracturing of a multi-well site is depicted in FIG. 5. In this embodiment, the downstream target locations include linearly aligned individual wells 160, 161, 162, 163 and the quick connect system 150 is provided as a mobile or portable platform based work station fluidly communicable with individual frac trees 146, 147, 148, 149 of the wells 160, 161, 162, and 163 via temporary surface fluid piping such as separate fluid lines 166, 167, 168, 169—depicted here as a string of fluid conduit.

Figure 6:
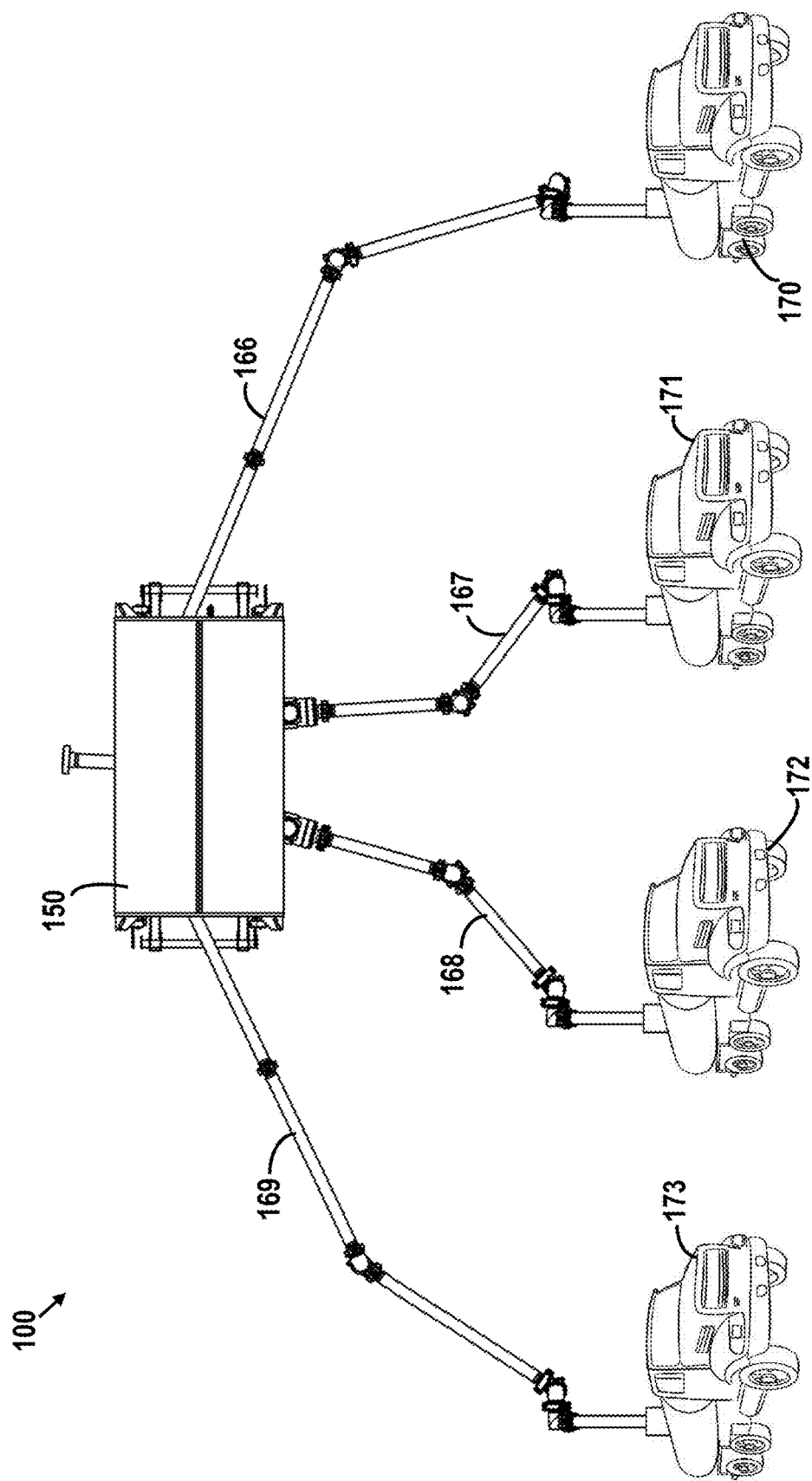
FIG. 6 is a top view of an embodiment of the system of this application including downstream containers.

In another embodiment, the quick connect system 150 may be operationally configured for operations other than hydraulic fracturing, for example, for directing fluid to one or more downstream containers, including, but not necessarily limited to holding tanks, vats, land and/or marine vessels, reservoirs, fresh water bodies such as ponds, rivers, lakes, aquifers, salt water bodies such as the ocean and related bodies, and combinations thereof. As an example, the quick connect system 150 may be operationally configured to direct fluid to one or more tank trucks 170, 171, 172, 173 via fluid lines 166, 167, 168 and 169 as seen in FIG. 6. As persons of ordinary skill in the art can appreciate, in this example the system 100 may be used to direct fluid to any number of tank trucks by using the fluid lines repetitively. For example, once fuel truck 170 is filled with fluid and disconnected from fluid line 166, a different tank truck may be fluidly connected to fluid line 166 for receiving fluid. Such exchange of tank trucks may be performed and repeated at each fluid line 166, 167, 168, 169 as desired.

One exemplary high-pressure fluid quick connect system 150 is provided with reference to FIGS. 7-22. Although the quick connect system 150 is discussed herein as being transportable allowing for operation at a variety of work sites and remote locations, it is also contemplated that in another embodiment a quick connect system 150 may be provided as a permanent installation. In the embodiment as shown, the quick connect system 150 includes a free standing box type framework including a first support member or "base member 200" for securing various operable components and a second support member 207 set apart from the base member 200 for securing other operable components of the quick connect system 150. In addition, the base member 200 may include a work platform 202 for personnel operating the quick connect system 150 and the quick connect system 150 may include a roof 204 providing cover of the work platform 202 and operable components of the quick connect system 150.

Figure 8:
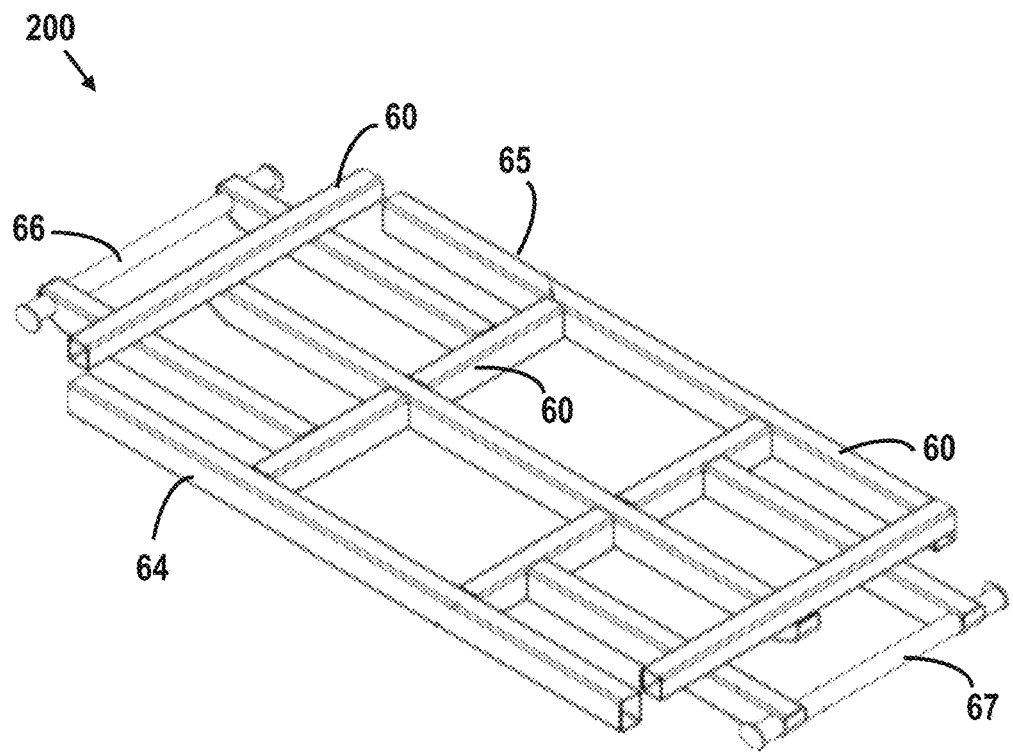
FIG. 8 is a top perspective view of an embodiment of a first support member of a quick connect system.
Figure 9:
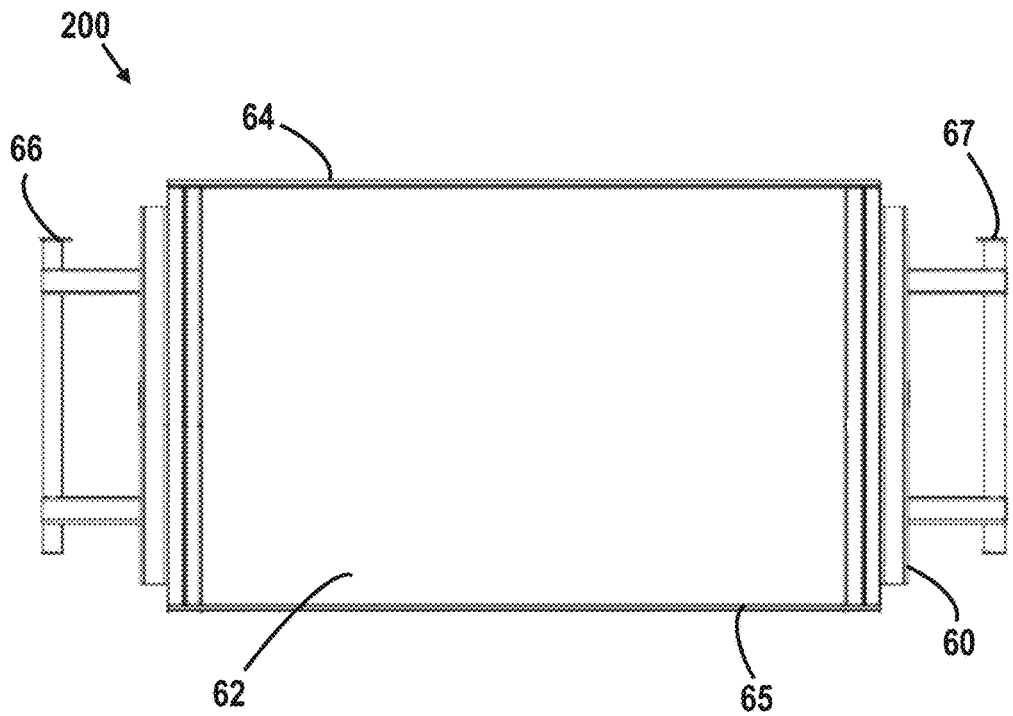
FIG. 9 is a bottom view of the first support member of FIG. 8.

As shown in FIGS. 8 and 9, one suitable base member 200 may include an assembly of elongated members or beams 60 and a first planar member or "base plate 62" secured to a first side of the beams 60 providing a bottommost section of the base member 200 operationally configured to be set atop a support surface such as the ground, flatbed of a trailer or other vehicle, or concrete slab. In this embodiment, the beams 60 include rectangular tubing forming a rectangular base member 200 defined by sidewalls 64, 65. However, in another embodiment beams 60 may include a non-rectangular shape and be assembled to provide a non-rectangular perimeter shape.

In this embodiment, the ends of the base member 200 are defined by tail boards (hereafter "rail members 66, 67") secured to the beams 60. In this embodiment, the rail members 66, 67 are provided as cylindrical members although multi-sided beams may be employed in another embodiment. Suitably, the rail members 66, 67 are operationally configured as attachment surfaces for a hook of a winch system, e.g., a winch truck, for loading and unloading the quick connect system 150 on and off of flatbed trailers and the like. It is also contemplated that the quick connect system 150 be moved across a support surface such as the ground at a work site. For example, at a hydraulic fracturing multi-well site the quick connect system 150 may need to be moved from a first location on the ground to a second location. As such, a truck, tractor or other vehicle may be employed for pulling the quick connect system 150 across the ground if necessary.

The beams 60 and rail members 66, 67 may be secured together as desired according to their materials of construction. For example, the beams 60 and rail members 66, 67 may be attached via fasteners, e.g., threaded fasteners. In an embodiment including metal beams 60, the beams 60 may be welded together. In other embodiments, clamps, adhesives, joint fittings, and combinations thereof may be employed. Likewise, the base plate 62 may be attached to the beams 60 via fasteners, welds, adhesives, and combinations thereof. In an embodiment including metal beams 60 and a metal base plate 62, the base plate 62 is suitably welded to the beams 60.

Figure 10:
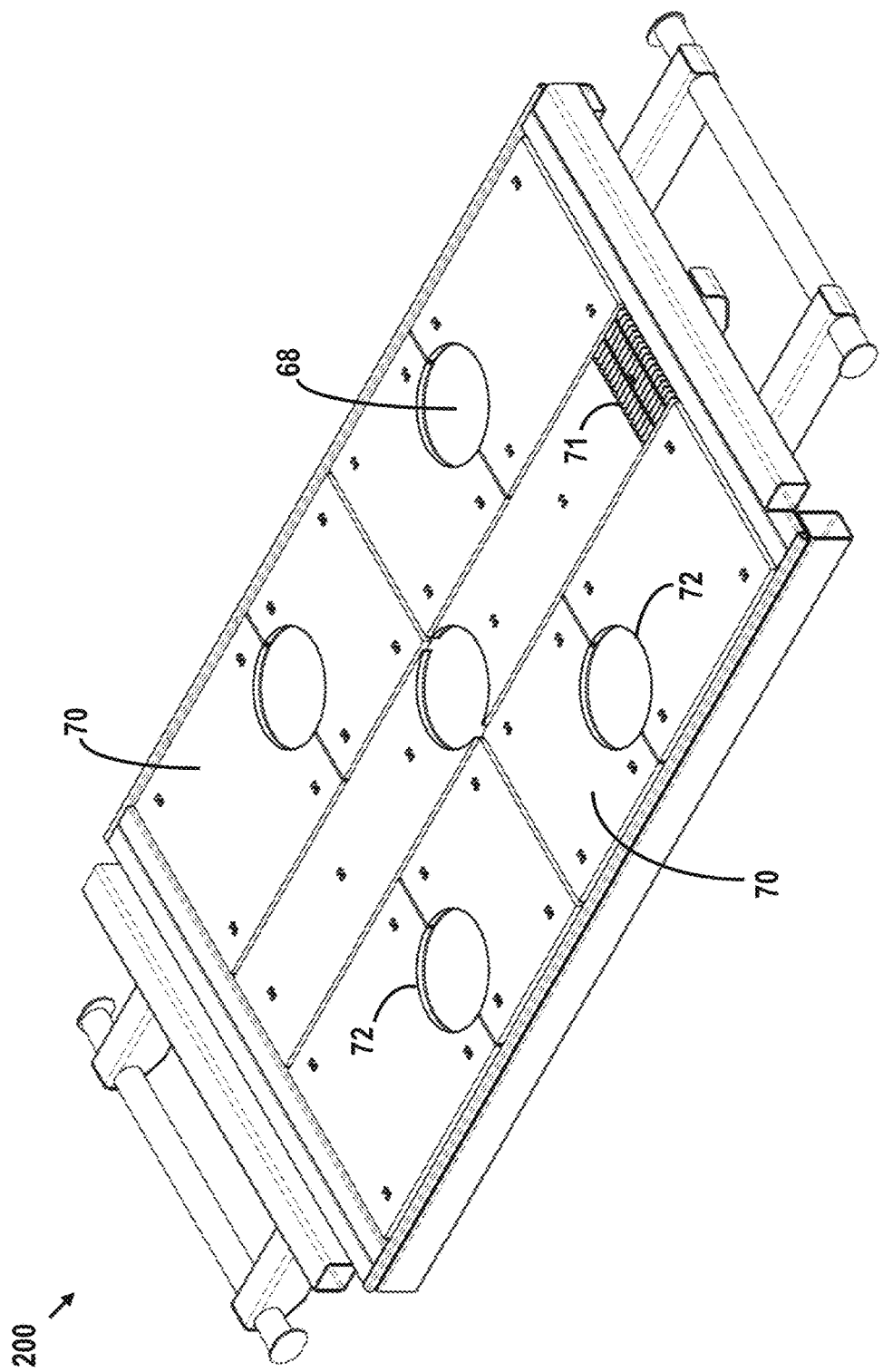
FIG. 10 is a perspective view of the first support member of FIG. 8 including a work platform.

As shown in FIG. 10, the base member 200 also includes a second planar member or "floor 68" secured to a second side of the beams 60. The floor 68 may be secured to the beams 60 similarly as the first planar member described above. For example, in an embodiment including metal beams 60 and a metal floor 68, the floor 68 may be welded to the beams 60. Once the floor 68 is secured to the beams 60, a work platform 202 may be attached to the floor 68 providing a work surface for personnel. In an embodiment whereby the floor 68 is welded to the metal beams 60, the welds are suitably ground flat providing planar type surfaces for receiving a work platform 202.

In one embodiment, the work platform 202 may be provided as a single planar type member to be attached to the floor 68. As shown in FIG. 10, a work platform 202 may include a plurality of individual platform members 70 attached to the floor 68. A suitable work platform 202, or its individual platform members 70, may be constructed from one or more materials as desired, e.g., plastics, woods, composite materials, metals, and combinations thereof. For high-pressure fluid operations, suitable materials of construction include, but are not necessarily limited to metals such as steel, aluminum, and combinations thereof. In one embodiment, one or more platform members 70 may be provided as solid planar members and may include a non-slip surface. In another embodiment, one or more of the platform members 70 may include solid planar members with a plurality of through holes disposed across the surface. In still another embodiment, one or more of the platform members 70 may include bar grating—see bar grating section 71 in FIG. 10. In another embodiment, the entire platform may be comprised of metal bar grating similar as the bar grating of bar grating section 71. In one particular embodiment, the entire platform may comprise a plurality of platform members 70 in the form of serrated surface bar grating constructed from carbon steel, stainless steel, galvanized steel, fiber reinforced plastic, and combinations thereof. Suitable metal bar grating is available from numerous commercial sources, e.g., P&R Metals, Inc., Birmingham, Ala., U.S.A.

Still referring to FIG. 10, the work platform 202 suitably includes a plurality of openings for securing or otherwise holding at least part of a fluid inlet assembly and a plurality of fluid outlet members in operable positions as discussed below. In the embodiment of FIG. 10 including a plurality of platform members 70, the platform members 70 suitably include perimeters shapes effective to collectively form a rectangular platform with a plurality of openings or "cutouts 72" that are operationally configured to each receive at least part of a corresponding fluid outlet member therein and a centrally located cutout 73 for receiving at least part of a fluid inlet assembly therein. As understood by the skilled artisan, the total number and/or shape of individual platform members 70 may change according to the number of fluid outlet members and/or the desired size of cutouts 72, 73.

Suitably, a bar grating type platform allows fluids such as spilled fluids to flow down through the openings in the bar grating whereby the fluid can be captured by the floor 68—the floor 68 acting as a type of drip catch. In an embodiment where the floor 68 is welded to the beams 60, the welds suitably form a fluid seal for the capture of fluid on the surface of the floor 68.

As shown in FIGS. 11 and 12, the base member 200 suitably includes at least one drain 74 operationally configured to remove captured fluid from the quick connect system 150. One suitable drain 74 includes an aperture 75 through the floor 68 with a conduit member 76 connected thereto for routing captured fluid from the surface of the floor 68 out from the base member 200. In an embodiment of platform members 70 comprised of bar grating, the upper surface of the floor 68 may include a plurality of raised surfaces for engaging the bottom surface of the bar grating thereby providing a space 61 between the upper surface of the floor 68 and the bottom surface of the bar grating for the flow of captured fluid toward the drain 74. In another embodiment, the bottom surface of the bar grating may include one or more raised surfaces for resting against the upper surface of the floor 68. In still another embodiment, the bar grating may include cutout sections providing one or more flow paths for captured fluid there through toward the drain 74.

In the embodiment of FIG. 12, the conduit member 76 includes a ninety-degree elbow connector fitted with a Camlock quick disconnect. For hydraulic fracturing operations, one suitable Camlock quick disconnect may include a 5.08 cm (2.0 inch) female Camlock with a 2.0 inch NPT. In this embodiment, the conduit member 76 is located in the space between the base plate 62 and the floor 68. As such, in the event of fluid leakage at the drain 74, the base plate 62 may act as a secondary fluid drip catch.

Turning now to FIGS. 13-15, in an embodiment including bar grating type platform members 70, the individual platform members 70 are suitably releasably secured to the floor 68 via a plurality of fastener assemblies disposed across the floor 68 and corresponding platform members 70. In particular, the floor 68 may include a plurality of raised threaded female members 80 operationally configured to receive threaded male members 81 therein as depicted in FIG. 15. One suitable male member 81 includes a threaded bolt. As further depicted in FIG. 15, each fastener assembly also includes a bracket member 82 including a hole for receiving a male member 81 there through, the bracket member 82 including opposing wing sections 83 operationally configured to abut vertical sections 85 of the bar grating in a manner effective to secure the individual platform members 70 in a fixed position against the floor 68. As shown, a suitable bracket member 82 provides clearance or space for a wrench or other tool to turn the male member 81 as desired.

Figure 16:
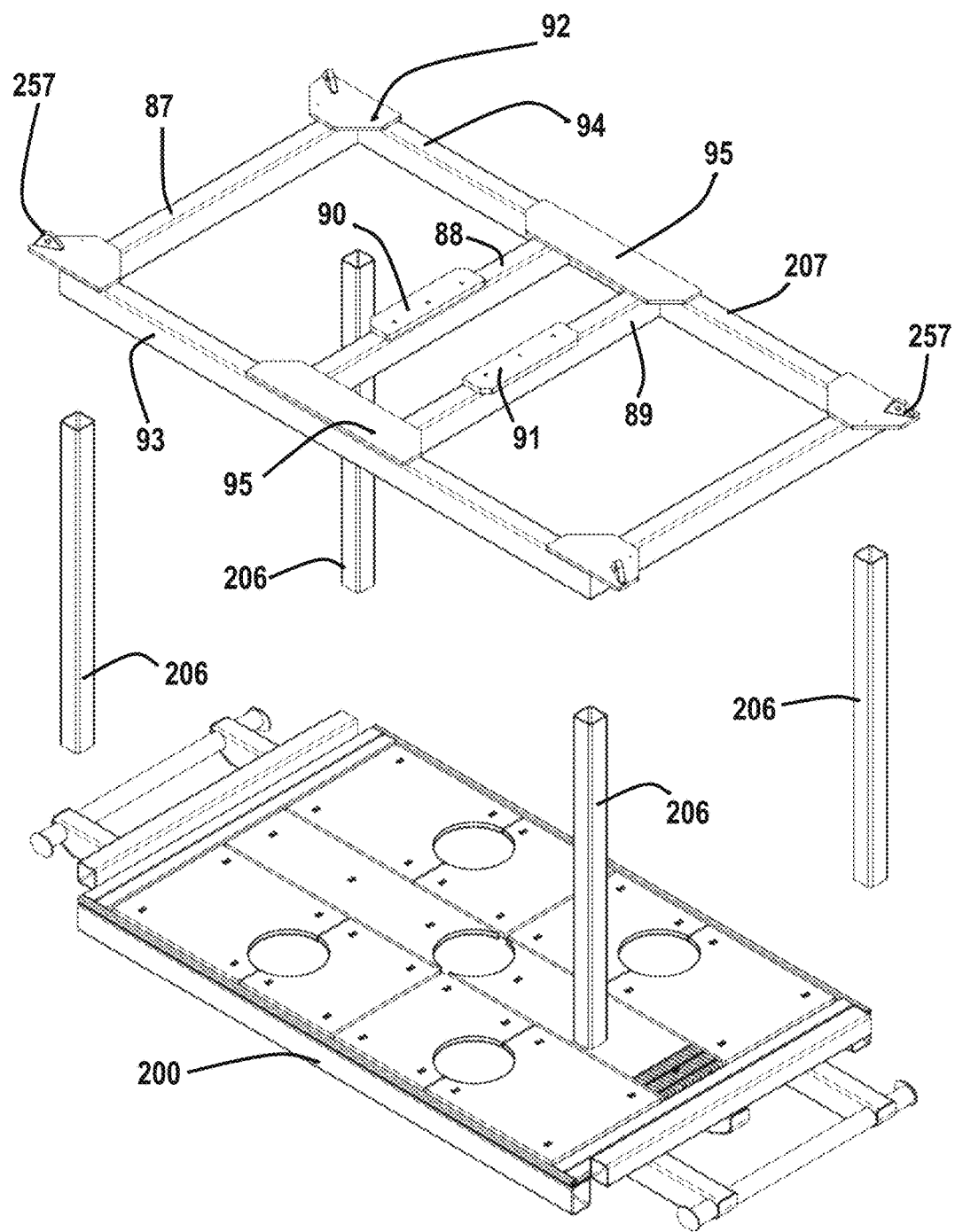
FIG. 16 is an exploded perspective view of an embodiment of the framework of the quick connect system.

With attention to FIG. 16, once the base member 200 is assembled, a first end of vertical support members 206 may be secured to the base member 200 and a second support member 207 may be secured at a second end of the vertical support members 206 forming a box type framework. In an embodiment of the quick connect system 150 designed for assembly and disassembly, the vertical support members 206 may be releasably secured to the base member 200 and the second support member 207 via fasteners, brackets, and combinations thereof. In an embodiment of the quick connect system 150 intended as a permanent structure, the base member 200, second support member 207 and vertical support members 206 may be constructed from metal and welded together in a permanent manner.

Figure 17:
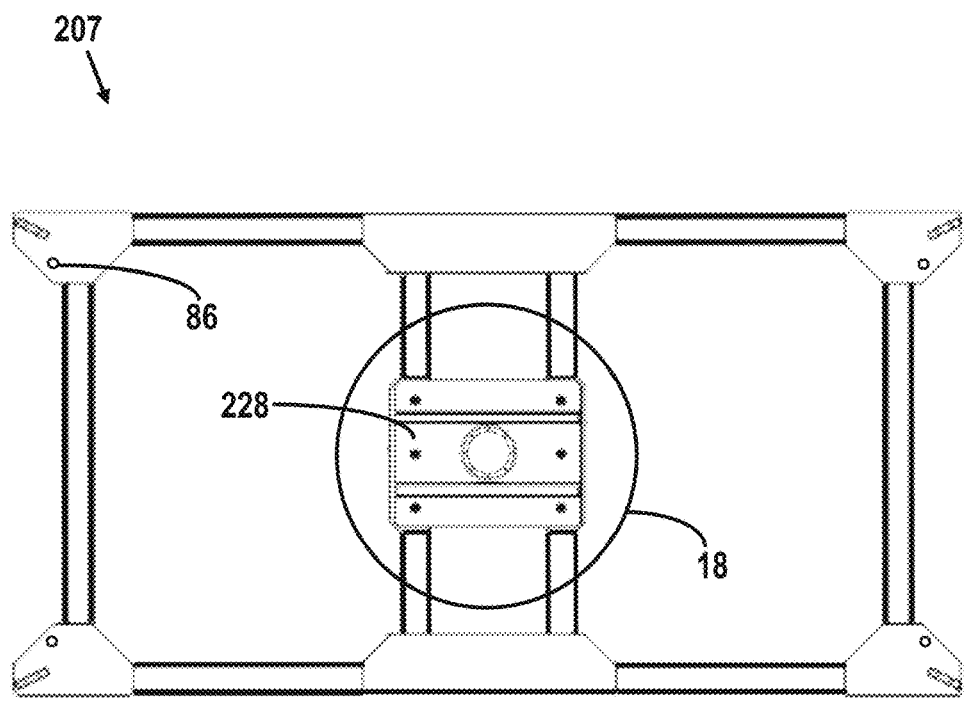
FIG. 17 is a top view of a second support member including a top plate of a swivel assembly attached thereto.
Figure 18:
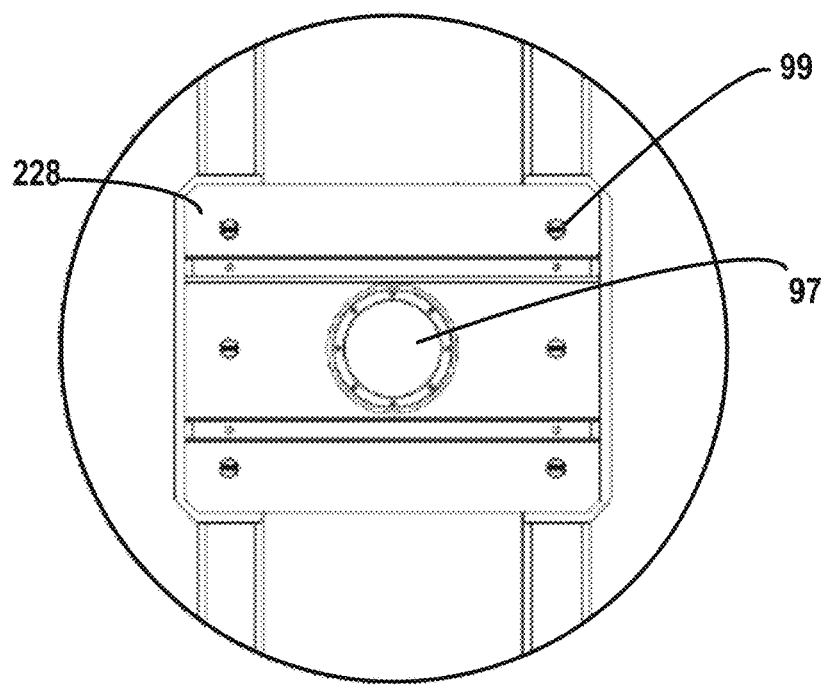
FIG. 18 is a top view of the top plate of FIG. 17.

One suitable second support member 207 may include a perimeter frame type member comprised of rectangular tubing as seen in FIG. 16. In one embodiment, the perimeter frame type member may be provided as a single member. As seen in FIG. 16, the perimeter frame type member may be comprised of individual elongated members 87 assembled together providing an outer perimeter substantially similar as the outer perimeter of the base member 200. The elongated members may be releasably secured via fasteners, brackets, and combinations thereof, or permanently secured, e.g., via welds. As further shown, the second support member 207 suitably includes parallel crossbars 88, 89 disposed across the side members 93, 94, each crossbar 88, 89 having a mounting bracket 90, 91 operationally configured to hold and secure a swivel assembly 227 as described below. In this embodiment, the crossbars 88, 89 are constructed from rectangular tubing similar as the perimeter frame and may be releasably secured to the side members 93, 94 via fasteners, brackets, and combinations thereof or permanently secured to the side members 93, 94, e.g., via welds. As shown, planar type bracing members 95 may also be employed for further securing the crossbars 88, 89 to the side members 93, 94. For example, opposing bracing members 95 may be welded to opposing ends of the crossbars 88, 89 and to the side members 93, 94 as shown. FIGS. 17 and 18 illustrate a top view of a top plate 228 of a swivel assembly 227 mounted to the mounting brackets 90, 91 via fasteners 99. As discussed below, the swivel assembly 227 includes a cylindrical opening 97 axially aligned with cutout 73. As discussed below, the aperture 97 is operationally configured to receive an actuator shaft, e.g., a rod 268, therein as described below.

As further shown in FIG. 16, the corners of the second support member 207 may also include planar type bracing members 92 secured to adjacent sides of the perimeter frame type member. As such, the bracing members 92 may be effective for holding adjacent elongated members 87 in a fixed position. For example, bracing members 92 may be welded to the perimeter frame type member. As shown, one or more of the bracing members 92 may also include lifting type contact surfaces in the form of one or more lift eyes 257, handles, hook members, or the like for lifting, moving and transporting the quick connect system 150. In this embodiment, lift eyes 257 are located near the corners of the second support member 207 beyond the outer perimeter of the second support member 207.

Figure 19:
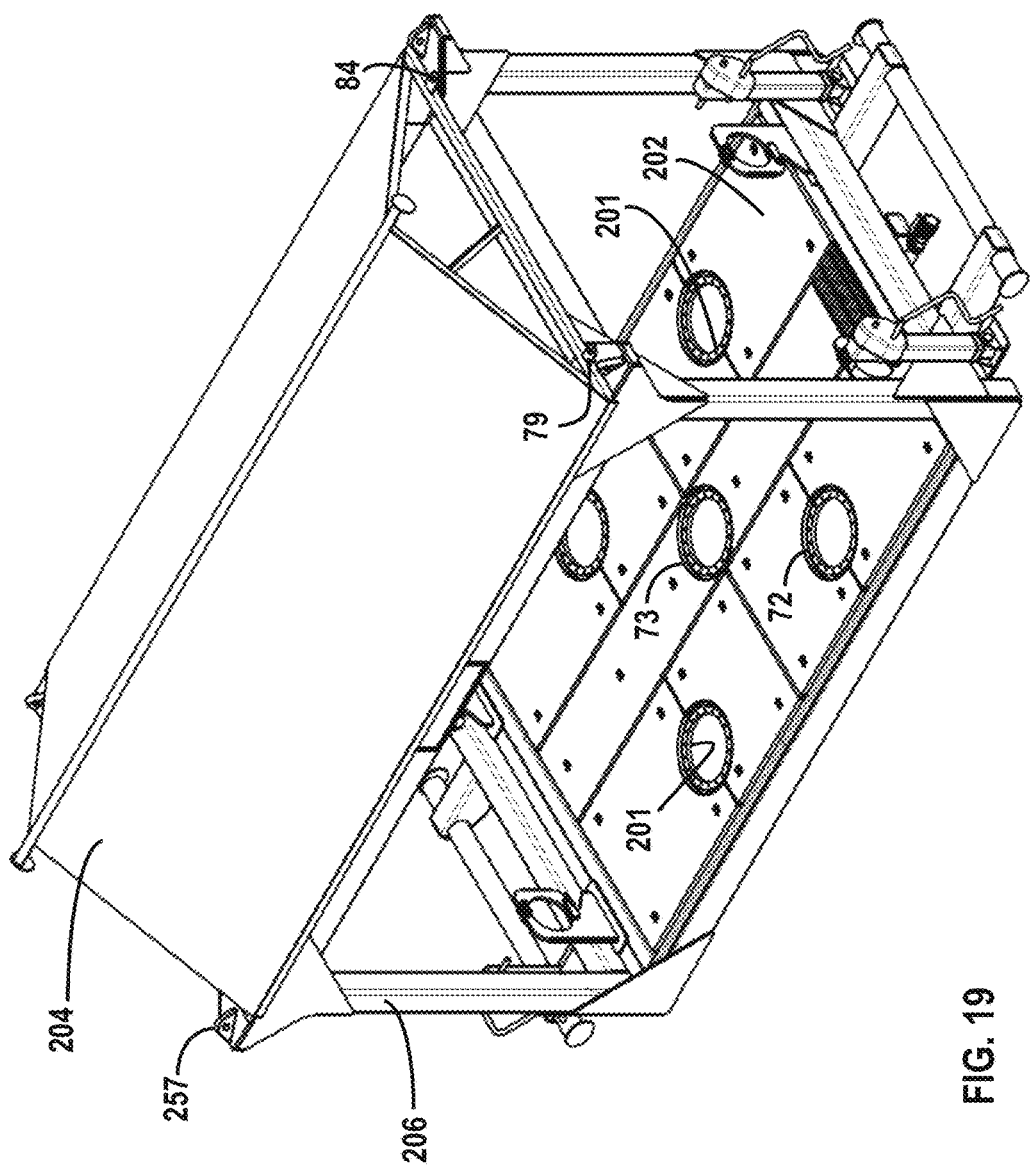
FIG. 19 is a perspective view of an embodiment of the framework of the quick connect system including a roof.

With reference to FIG. 19, a roof 204 may be releasably secured or permanently secured to the second support member 207. One suitable roof 204 may include a pitched roof 204 including a width substantially similar as the second support member 207 and a length less than the length of the second support member 207 effective to expose the lift eyes 257 as shown. A suitable removable roof 204 may include brackets 79 with openings there through corresponding to apertures 86 disposed along the bracing members 92 for receiving fasteners or release pins 84 there through in a manner effective to secure the roof 204 to the second support member 207. As shown, the roof 204 is provided as a pitched roof although in another embodiment the roof 204 may be flat, slanted or another configuration as known to persons of ordinary skill in the art of architecture. The roof 204 may also include one or more drain gutters common to structures such as homes and buildings. The inner surface of the roof 204 may be provided with one or more light sources suitable for low light or nighttime operations of the quick connect system 150. In another embodiment, one or more sun roofs may be included to allow natural light to be directed to the operable components of the quick connect system 150. One or more light sources may be battery powered and/or solar powered via solar panels installed on the roof 204 and/or include outlet(s) for receiving electricity from an electrical line or generator.

Still referring to FIG. 19, each of the cutouts 72, 73 suitably includes a bearing housing including, but not necessarily limited to a bearing assembly such as a double turnplate bearing including, but not necessarily limited to a slewing ring bearing (hereafter "bearing 201") disposed along the inner perimeter of each cutout 72, 73. Each bearing 201 is operationally configured as a turnable seat for corresponding components communicated with each of the bearings 201 as described below.

In this embodiment, the location of the cutouts 72, 73 and the size and shape of the components making up the fluid inlet assembly and the fluid outlet assembly suitably provides a swing arm type member that is turnable about the axis of cutout 73 and equidistant from the cutouts 72. Although the cutouts 72 of this embodiment are oriented in a uniform manner along the platform 202, e.g., a square layout with a centrally located cutout 73, in another embodiment one or more of the cutouts 72, 73 may be aligned along the platform 202 in a different layout according to a particular operation. For example, one or more of the cutouts 72, 73 may be aligned along the platform 202 according to the location of corresponding downstream fluid target locations at a particular site such as a particular multi-well site.

In another implementation, the base member 200 described above may be mounted to a flatbed trailer or other vehicular axle platform. In still another implementation, a flatbed of a trailer or other vehicular axle platform may be operationally configured as a base member for a quick connect system 150. In such embodiment, a flatbed of a trailer may include a fluid drip catch and drain at a point within the flatbed framework below an upper surface supporting the quick connect system 150 thereon.

As described below, in one suitable embodiment, the fluid inlet assembly and the fluid outlet assembly of the quick connect system 150 are comprised of fluid conduits including fluid diverters operationally configured to redirect the flow path of fluid from a fluid inlet of the quick connect system 150 to a fluid outlet of the quick connect system 150. As described herein, fluid flows through the quick connect system 150 primarily horizontally and vertically according to each of the fluid conduits employed. For example, fluid may flow into the fluid inlet assembly horizontally from one or more upstream fluid sources 102 and exit vertically downward into the fluid outlet assembly. In such embodiment, fluid suitably flows into the fluid outlet assembly vertically downward and exits the fluid outlet assembly horizontally at a right angle to downstream fluid target locations. In another embodiment, fluid may flow into the fluid inlet assembly horizontally and exit horizontally into the fluid outlet assembly. In yet another embodiment, fluid may flow in one or more non-horizontal and/or non-vertical directions.

Figure 7:
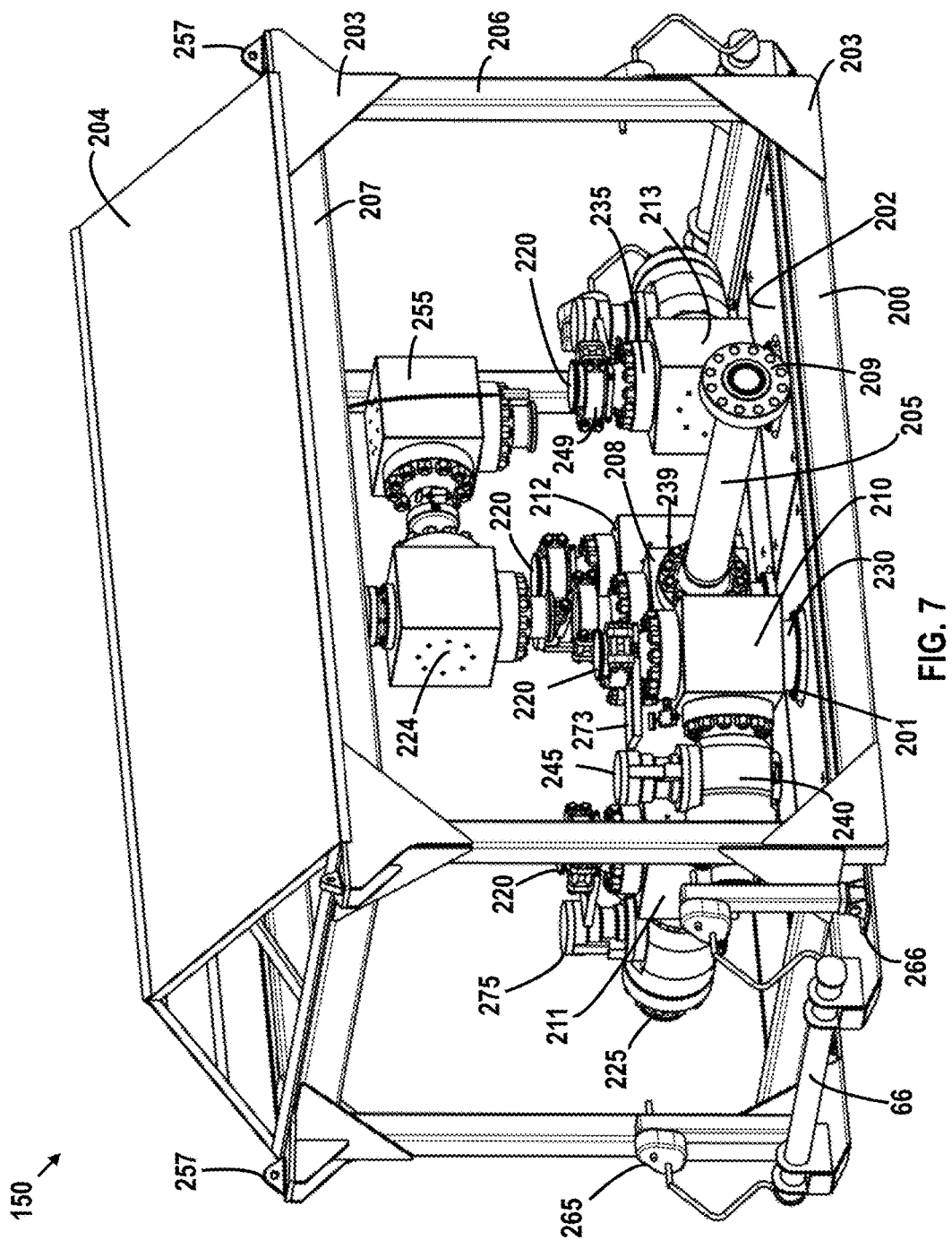
FIG. 7 is a perspective view of an embodiment of a quick connect system of the present application.
Figure 20:
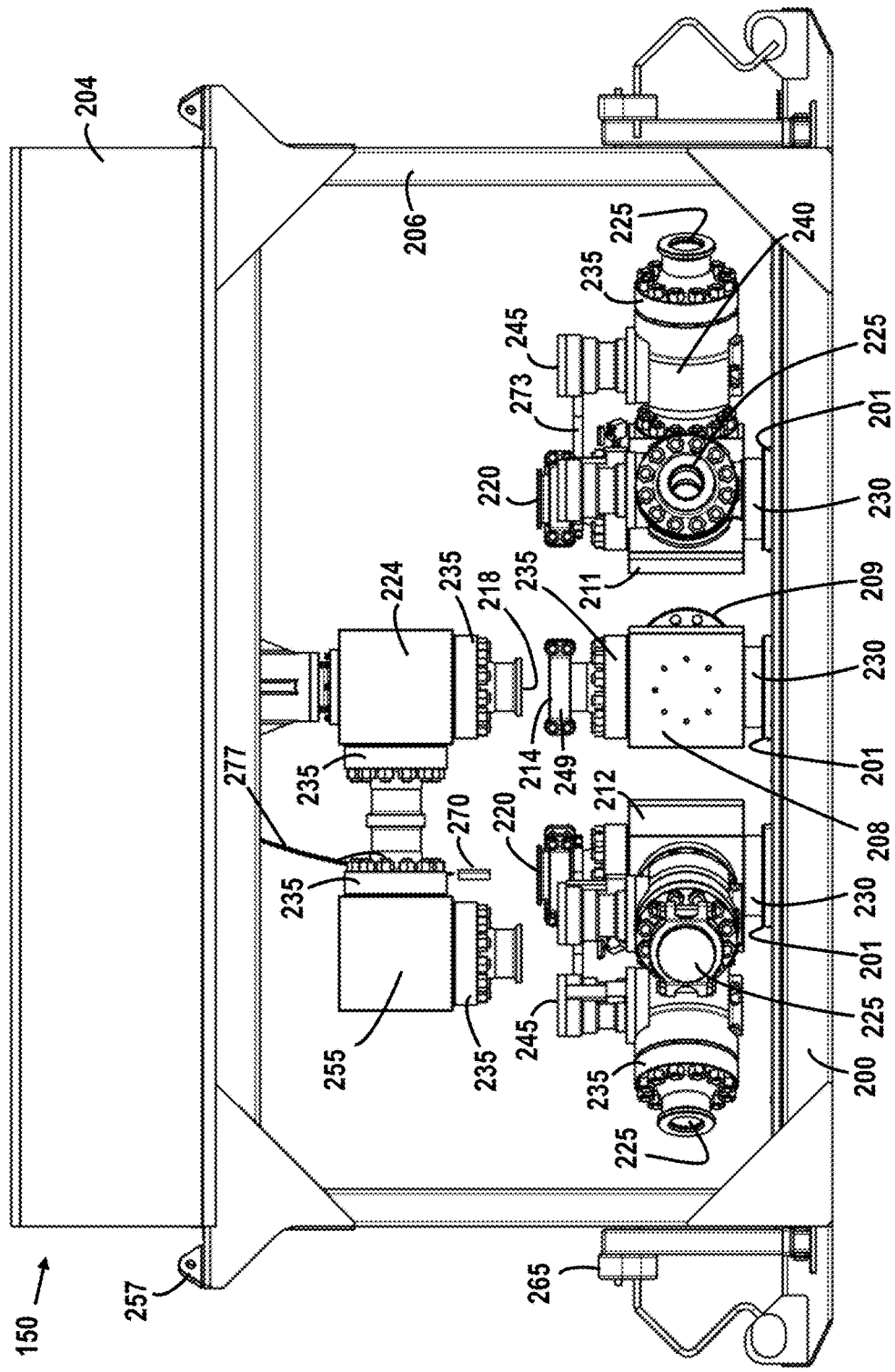
FIG. 20 is a side elevation view of the quick connect system of FIG. 7.
Figure 21:
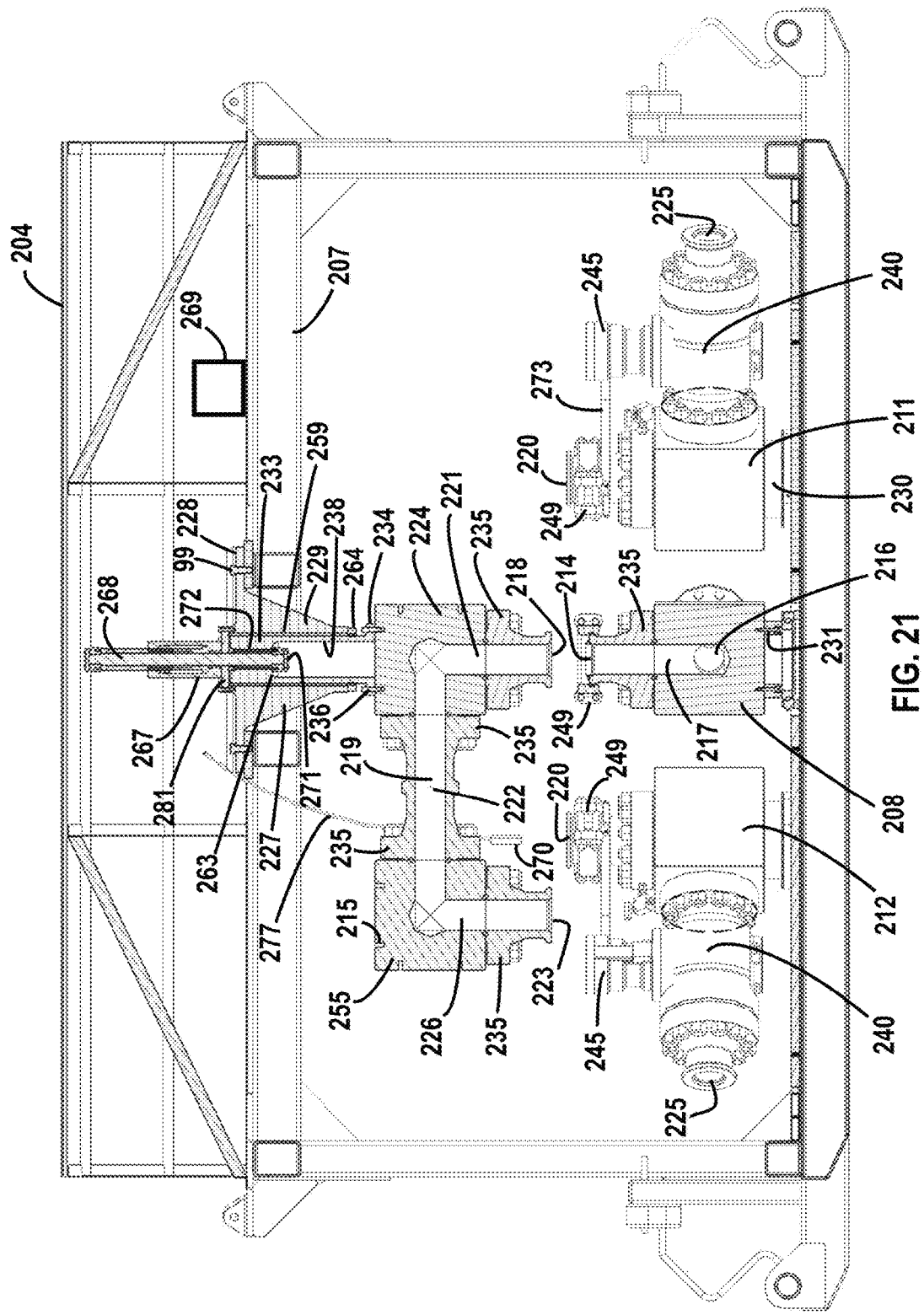
FIG. 21 is a partial sectional side elevation view of the quick connect system of FIG. 7.

With reference to FIGS. 7, 20 and 21, the fluid inlet assembly suitably includes a first part or first assembly (or "base assembly") and a second part or second assembly (or "upper assembly") set apart from the first assembly operationally configured to be fluidly communicated with the first assembly during quick connect system 150 operation and fluidly disconnected from the first assembly during nonuse. The first assembly is suitably comprised of a first fluid conduit member of the fluid inlet assembly (hereafter "first fluid inlet conduit member 208" or "first conduit member 208") operationally configured to receive fluid therein and divert or otherwise change the direction of fluid flowing there through. The first conduit member 208 is rotatably mated with cutout 73 and operationally configured to be fluidly communicated with a fluid conduit or trunk line releasably attached thereto (hereafter "fluid inlet connector 205"), which is operationally configured to receive fluid from one or more upstream fluid sources 102, including, for example, high-pressure fluid via high-pressure frac iron and frac pumps, and route the fluid into the first conduit member 208. Looking at FIG. 7, the fluid inlet connector 205 may include a tubular member such as piping extending out horizontally from the first conduit member 208, the fluid inlet connector 205 having a flange member 209 at its distal end for fluidly connecting with an upstream tubular member of a fluid input line 104 and a flange member 239 at its proximal end for fluidly communicating with the first conduit member 208 via a fluid inlet 216 on a side surface of the first conduit member 208. As understood by persons of ordinary skill in the art of pipe fitting, in one embodiment, an outer face of a flange member 239 may be set in direct abutment with the outer surface of the first conduit member 208 and secured to the first conduit member 208 via threaded fasteners such as bolts mated with threaded holes disposed about the fluid inlet 216 of the first conduit member 208. In another embodiment, one or more seals and/or gaskets may be set between the flange member 239 and the outer surface of the first conduit member 208.

The second assembly of the fluid inlet assembly is suitably secured to the second support member 207 and includes (1) a second fluid conduit member (hereafter "second inlet conduit member 224" or "second conduit member 224") axially aligned with the first conduit member 208 that is operationally configured to divert or otherwise change the direction of fluid flowing there through and (2) a third fluid conduit member (hereafter "third inlet conduit member 255" or "third conduit member 255") operationally configured to divert or otherwise change the direction of fluid flowing there through, the third conduit member 255 being positioned to the side of the second conduit member 224 at a distance for axial alignment with individual fluid outlet conduit members 210-213 of the fluid outlet assembly.

In the embodiment as shown, the fluid outlet assembly of the quick connect system 150 is depicted as having four fluid outlet conduit members, namely, first outlet conduit member 210, second outlet conduit member 211, third outlet conduit member 212 and fourth outlet conduit member 213, each outlet conduit member being rotatably mated with one of the four cutouts 72. As discussed below, fluid is suitably routed from the third conduit member 255 to each of the outlet conduit members 210-213 in a segregated or isolated manner.

In this embodiment, each of the conduit members 208, 210-213, 224, 255 are operable as fluid conduits each having a main body (shown here as block shape members) with an internal fluid flow passage operationally configured to redirect or divert the flow of fluid there through (e.g., see internal fluid flow passages 217, 221 and 226 in FIG. 21). As such, each of the conduit members of this particular embodiment may also be referred to as fluid diverters.

As shown in FIG. 21, the main body portions of the conduit members 208, 210-213, 224, 255 may be provided as solid members with an internal fluid flow passage formed there through, e.g., a bore through. In another embodiment, the main body portions of one or more of the conduit members 208, 210-213, 224, 255 may be provided as hollow housings with conduit or piping disposed there through, e.g., an L-shape fluid conduit or a curved fluid conduit. Although the main bodies of the conduit members 208, 224, 255 and the outlet conduit members 210-213 are shown as block shape members, other outer surface configurations are herein contemplated without disturbing desired operation of the internal fluid flow passage of each. As illustrated in FIG. 21, each of the conduit members includes an internal fluid flow passage operationally configured to redirect or divert the flow of fluid ninety-degrees.

As further depicted, each of the conduit members may also include one or more connectors operationally configured to fluidly interconnect the internal fluid flow passages of various conduit members. In one embodiment, connectors may be provided as crossover connectors integral to the one or more conduit members, e.g., connectors forged to conduit members. Another suitable connector may include a removable crossover connector such as a crossover flange 235 as shown. Similar as described above, crossover flanges 235 may also be releasably attached to conduit members at their internal fluid flow passages openings via threaded fasteners such as bolts mated with threaded holes disposed about the inlets/outlets as is common in flange connections. In one embodiment, one or more crossover flanges 235 may be set in direct abutment against the outer surface of the conduit members. In another embodiment, one or more seals and/or gaskets may be set between one or more of the crossover flanges 235 and the outer surface of the conduit members. As seen in FIG. 21, one or more sides of the conduit members may include a similar layout of threaded holes 215 whereby each of the conduit members of the quick connect system 150 are interchangeable and may be used as part of the fluid inlet assembly or the fluid outlet assembly. Likewise, additional conduit members may be stored on location of an operation and used to replace any of the conduit members 208, 210-213, 224, 255 as may be required.

In this embodiment, the first conduit member 208 has a crossover flange 235 located on its upper surface defining a fluid outlet 214 of the first conduit member 208. The second conduit member 224 includes a first crossover flange 235 defining a fluid inlet 218 and a second crossover flange 235 defining a fluid outlet 219 of the second conduit member 224. The third conduit member 255 includes a first crossover flange 235 defining a fluid inlet 222 fluidly communicable with fluid outlet 219 and a second crossover flange 235 defining a fluid outlet 223 of the third conduit member 255 as seen in FIG. 21. When fluidly connected, the second conduit member 224 and third conduit member 255 provide a moveable fluid pathway in the form of an internal fluid flow passage including two vertical sections and one horizontal section disposed there between as shown. In this embodiment, the second crossover flange 235 of the second conduit member 224 in combination with the third conduit member 255 and its two crossover flanges provide a swing arm of the quick connect system 150. As shown, in addition to the size of the second and third conduit members 224, 255, part of the length of the swing arm is determined according to the size of the crossover flanges 235 there between. Herein, the length of the swing arm is effective for fluid communication with each of the outlet conduit members 210-213, which are located along an arc as understood by the skilled artisan.

Each of the outlet conduit members 210-213 suitably includes a first crossover flange 235 attached at the top of each outlet conduit member 210-213 defining a fluid inlet 220 and a second cross over flange 235 attached along a side of each outlet conduit member 210-213 defining a fluid outlet 225 of each outlet conduit member 210-213. As such, each of the outlet conduit members 210-213 includes an internal fluid flow passage operationally configured to receive a vertical directional flow of fluid from the third conduit member 255 and discharge the fluid in a horizontal direction via fluid outlet 225. As shown, each internal fluid flow passage of the outlet conduit members 210-213 includes a bend such as a right angle similar as the second and third conduit members 224, 255 as seen in FIG. 21. In another embodiment, one or more internal fluid flow passages may include a curved flow passage for changing the directional flow path of fluid flowing there through.

As understood by the skilled artisan, crossover flanges 235 may be secured together via a flanged connections 249 as shown. A suitable crossover flange 235 for high-pressure fluid operations may include a working pressure up to about 137.9 MPa (20,000.0 psi). Suitable crossover flanges 235 are commercially available from Oceaneering International, Inc., Houston, Tex., U.S.A., under the GRAYLOC® product line.

With further reference to FIGS. 7, 20 and 21, the bottom surface of the first conduit member 208 and each of the outlet conduit members 210-213 includes a cylindrical neck portion 230 extending from the bottom side thereof operationally configured to rotatably attach or rotatably mate with a corresponding cutout 72, 73 in a secure manner effective for the first conduit member 208 and the outlet conduit members 210-213 to communicate with a corresponding bearing 201 housed therein. In one implementation, each of the bearings 201 may include a raised outer ring member providing a female type fitting for securing at least part of a corresponding neck portion 230 therein. Suitably, the bottom surface of each neck portion 230 rests against an upper surface of an inner rotating ring member of the bearing 201 effective for turning the first conduit member 208 and the outlet conduit members 210-213 in place and orienting each member directionally as desired or as may otherwise be required for ease of rig up of the system 100. In another embodiment, one or more cutouts 72, 73 may include a different female mating configuration. For example, the perimeter of one or more cutouts 72, 73 may include raised surfaces forming a female type fitting. In addition, the neck portions 230 may include different shapes than as described above. In one embodiment, the neck portion 230 may include a flange or similar shaped member and be secured to its corresponding main body portion via fasteners 231 (see FIG. 21) e.g., sunken type threaded fasteners. In another embodiment, a neck portion 230 may be provided as part of a conduit member as a one-piece construction.

With particular attention to FIG. 21, the quick connect system 150 also includes a swivel connector in the form of a swivel assembly 227 releasably secured to the second support member 207. Suitably, the second conduit member 224 is rotatably attached to the swivel assembly 227 whereby the swivel assembly 227 acts as a pivot point for the third conduit member 255 360.0 degrees. The swivel assembly 227 is also operationally configured to maintain the second conduit member 224 in axial alignment with the first conduit member 208.

In this embodiment, the swivel assembly 227 includes a main body 229 defined by an opening 97 there through and a top plate 228 secured to the mounting brackets 90, 91 via fasteners 99. The swivel assembly 227 also includes a lift system mounted to the top plate 228 operationally configured to direct the second conduit member 224 and third conduit member 255 vertically up and down, i.e., the lift system is operationally configured to direct the second conduit member 224 linearly to (1) a position of fluid communication with the first conduit member 208 and to (2) one or more non-communicated positions, or distances, apart from the first conduit member 208 as illustrated in FIG. 21. The swivel assembly 227 further includes an elongated rotatable cylindrical member (hereafter "directional connector 233") moveable linearly within the opening 97 of the main body 229 and operationally configured to interconnect the lift system and the second conduit member 224. In this embodiment, the main body 229 is suitably operationally configured as a gusset type member providing structural support to the directional connector 233 and the top plate 228 of the main body 229.

The lift system of this embodiment includes an actuator, e.g., a hydraulic motor 267, mounted to the top plate 228 of the swivel assembly 227, the hydraulic motor 267 having an outer cylinder and a rotatable cylindrical rod 268 disposed there through and fixed to an annular inner surface of the directional connector 233. Depending on the size of the hydraulic motor 267 and the opening 97, the lift system may also include a cap member 281 releasably secured to the top plate 228 and operable as a seat for the hydraulic motor 267. The cap member 281 suitably includes a circular aperture for receiving the rod 268 there through as shown in FIG. 21.

As depicted, the directional connector 233 is provided as a hollow member including a first inner section 238 having a first inner diameter and a second inner section having a smaller second inner diameter for receiving the rod 268 there through—the outer diameter of the rod 268 being substantially similar as the second inner diameter. As shown, the junction between the first section 238 and the second section is suitably defined by an abutment surface 263 for a distal end of the rod 268. In detail, the distal ends of the rod 268 are suitably threaded and fitted with enlarged threaded end cap members such as threaded nut type members. As shown in FIG. 21, the distal end of the rod 268 suitably includes a first nut 271 secured to the directional connector 233 via threaded fasteners 272 disposed through holes in the directional connector 233 and terminating in corresponding female type mating surfaces of the nut 271, the fasteners 272 being effective to hold the first nut 271 against the abutment surface 263. The rod 268 and first nut 271 may also include corresponding apertures for receiving a horizontal set pin there through effective to prevent the first nut 271 from turning about the rod 268. Also, a crush plate or the like may be set between the first nut 271 and the abutment surface 263.

With further reference to FIG. 21, the directional connector 233 includes a flange 234 at its distal end that is located external the main body 229 and releasably attached to an upper surface of the second conduit member 224 via threaded fasteners 236. As such, the rod 268, the first nut 271, the directional connector 233 and the second conduit member 224 are communicated in a fixed manner and rotate in unison about a common axis. In other words, the rod 268, the first nut 271, the directional connector 233 and the second conduit member 224 are rotatable relative a fixed main body 229. To promote rotation of the directional connector 233, a bearing 259 is suitably disposed within the opening 97 between the directional connector 233 and the main body 229 as shown. As such, the main body 229 may also be referred to as a "bearing housing."

Optimum rotation of the directional connector 233 is suitably achieved when the directional connector 233 is set to a maximum retracted position within the main body 229 as seen in FIG. 21, thus, allowing the entire bearing 259 to act on the directional connector 233. Likewise, when the directional connector 233 is fully lifted within the main body 229 as shown, there is suitable clearance between the second and third conduit members 224, 255 and the outlet conduit members 210-213 allowing the third conduit member 255 to turn 360.0 degrees without obstruction from the outlet conduit members 210-213.

As understood by the skilled artisan, the hydraulic motor 267 may operate in a variety of applications and environmental conditions, including exposure to dust, debris or outside weather conditions. To prevent contaminants from entering the cylinder assembly of the hydraulic motor 267 a wiper seal 264 (also known as a scraper, excluder or dust seal) may be fitted on a proximal end of the main body 229 as shown in FIG. 21.

The lift system further includes a hydraulic pump 269 operationally configured to drive the hydraulic motor 267 as understood by the skilled artisan. In this embodiment, the hydraulic pump 269 is secured to the second support member 207 and is fluidly communicated with the hydraulic motor 267 via a hydraulic fluid line clamped or otherwise secured to the second support member 207. As shown, a control switch 270 may be employed for operating the hydraulic motor 267 by personnel on the platform 202. As shown, the control switch 270 is electronically communicated with the hydraulic motor 267 via an electric cable 277. The hydraulic motor 267 may also be controlled from one or more remote locations such as a data van or via a wireless connection. In another embodiment, an electric motor or pneumatic motor may be used in place of the hydraulic motor 267.

As further shown, each of the outlet conduit members 210-213 may include an isolation valve 240 and an actuator 245 for remote actuation of each isolation valve 240 for controlling fluid flow out through the outlets 225 of the outlet conduit members 210-213. Each of the isolation valves 240 may also be opened/closed manually by on-site personnel. In one embodiment, one or more of the isolation valves 240 and corresponding actuators 245 may be provided as integral part of an outlet conduit member 210-213. In another embodiment, one or more of the outlet conduit members 210-213 may be provided without valves.

Figure 22:
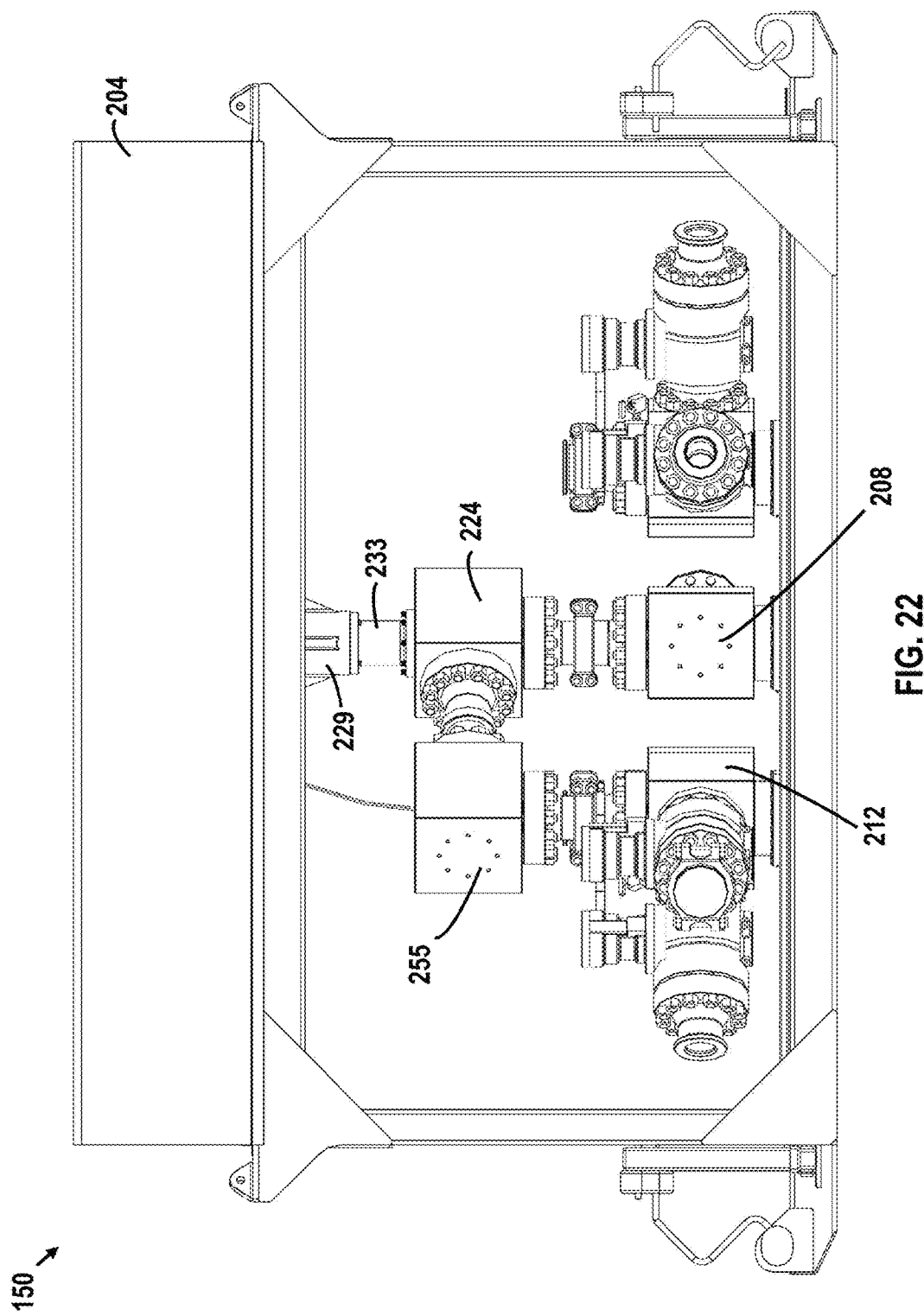
FIG. 22 is a side elevation view of the quick connect system of FIG. 7.

In operation, including hydraulic fracturing operations, during periods of non-use the quick connect system 150 is suitably set to an "OFF" position or non-operating position as shown in FIG. 20 with the directional connector 233 set to a fully retracted position within the main body 229. At an "OFF" position, the fluid inlet assembly is completely mechanically and fluidly detached or disengaged from the fluid outlet assembly as shown. Once a particular well is designated for stimulation, e.g., well 162, the third conduit member 255 is directed to a position above the well's corresponding outlet conduit member, e.g., third outlet conduit member 212, and the isolation valves 240 of outlet conduit members 210, 211 and 213 may be set to a closed position for safety purposes in the event the third conduit member 255 is matched with the wrong or non-targeted outlet conduit member. Thereafter, personnel may operate the hydraulic motor 267 via the control switch 270 to lower the second and third conduit members 224, 255 to an "ON" position or operating position whereby the second conduit member 224 is engaged, i.e., fluidly connected, to the first conduit member 208 and the third conduit member 255 is likewise fluidly connected to the third outlet conduit member 212 via their corresponding crossover flanges 325 as shown in FIG. 22. Once the quick connect system 150 is set to an "ON" position, high-pressure fluid may be pumped into the fluid inlet assembly from one or more upstream frac pumps. Once stimulation of well 162 is completed, the one or more frac pumps may be shut off and the second and third conduit members 224, 255 may be returned to an "OFF" position as shown in FIG. 20. If a different well is targeted for stimulation, the third conduit member 255 may turned and positioned above the targeted well's corresponding outlet conduit member and the stimulation process may be repeated as described above.

Other features may be included as part of the present quick connect system 150. For example, the quick connect system 150 may include frame supports 203 adding structural strength to the connections between the vertical support members 206 and the base member 200 and a second support member 207. The quick connect system 150 may also include one or more skid leveling systems 265 equipped with jacking legs 266 or the like for contacting a support surface of the quick connect system 150, e.g., ground, as necessary to level the work platform 202. The base member 200 may also include fork lift pockets for lifting, moving and transporting the quick connect system 150. Exemplary fork lift pockets are described in U.S. Pat. No. 3,561,633, titled "Container," issued on Feb. 9, 1971, which is herein incorporated by reference in its entirety. One or more of the outlet conduit members 210-213 may also include a releasable tray member 273 for supporting tools, clamps, one or more blind hubs or blind caps 275 for covering one or more inlets 220 as well as other items as desired. Other items and operable components may be added as desired, e.g., a control panel including control circuitry, visual and/or audible alarms, tool box. The quick connect system 150 may also include glow in the dark tape disposed thereon, e.g., to help mark the borders of the quick connect system 150 in low light and dark moments. In addition, flanged iron, swivel, and Graylok® connections are known products in the oil and gas industry and may be used as part of quick connect system 150.

Moreover, in an embodiment of the system 100 for hydraulic fracturing operations, the temporary surface piping and the quick connect system 150 may incorporate either single or dual flanged pipe rated for pump pressures and injection rates realized during hydraulic fracturing operations including hydraulic fracturing of a multi-well pad. In hydraulic fracturing operations, the pipe used may include steel pipe having an inner diameter from about 5.08 cm to about 25.4 cm (about 2.0 inches to about 10.0 inches). In one particular embodiment of the system 100 for hydraulic fracturing operations, the steel pipe employed may have an inner diameter from about 12.7 cm to about 17.78 cm (about 5.0 inches to about 7.0 inches). In another particular embodiment, the temporary surface piping may include steel pipe having an inner diameter of 17.78 cm (7.0 inches) with a wall thickness sufficient to sustain continuous delivery of fluid at high pressures, e.g., up to 137.9 MPa (20,000.0 psi).

The base member 200, support members 206, second support member 207, roof 204, conduit members 208, 210-213, 224, 255 and main body 229 are suitably constructed from one or more materials including but not necessarily limited to those materials resistant to chipping, cracking, excessive bending and reshaping as a result of ozone, weathering, heat, moisture, other outside mechanical and chemical influences, as well as various impacts and other loads placed on the quick connect system 150. Although the quick connect system 150 is not necessarily limited to any one particular material of construction and may be built to scale, for hydraulic fracturing operations the quick connect system 150 is suitably constructed from one or more materials durable enough to support up to about 11,339.8 kg (25,000.0 pounds) or more during transport and/or operation without failing. One or more components of the quick connect system 150 may also include a powder coat or other corrosion resistant material(s) applied to its various components as desired.

For hydraulic fracturing operations and other high-pressure fluid operations, the base member 200, support members 206, second support member 207, roof 204, conduit members 208, 210-213, 224, 255 and main body 229 are suitably constructed from steel, e.g., carbon steel, stainless steel, and combinations thereof. Likewise, the main body 229 and top plate 228 of the swivel assembly 227 are suitably constructed from steel, e.g., carbon steel, stainless steel, and combinations thereof. To save costs and/or to reduce the total weight of the quick connect system 150, the roof 204 may be constructed from one or more lighter metals such as aluminum, plastic, composite materials, fiber reinforced plastic, and combinations thereof. In low pressure fluid operations, the base member 200, support members 206, second support member 207 and conduit members 208, 210-213, 224, 255 and main body 229 may be constructed from one or more metals, plastics, composite materials, fiber reinforced plastics, woods, and combinations thereof. Suitable metals include, but are not necessarily limited to carbon steel, stainless steel, aluminum, and combinations thereof.

Although the quick connect system 150 may be built to scale, in an embodiment configured for hydraulic fracturing operations as shown in FIG. 7, the quick connect system 150 includes a height at an upper surface of the second support member 207 of about 3.05 meters (10.0 feet); a width of about 2.49 meters (8.17 feet) and a length of about 5.56 meters (18.25 feet). In this embodiment, the quick connect system 150 may include total weight of about 18597.3 kg (41,000.0 pounds) depending on the materials of construction and the size and thickness of components used.

In still another embodiment of the quick connect system 150, a second conduit member 224 may be operationally configured to receive fluid directly from a fluid inlet connector 205 by fluidly connecting the fluid inlet connector 205 directly to the second conduit member 224. In such embodiment, the fluid inlet assembly is comprised of the second and third conduit members 224, 255 and the internal fluid flow passage of the second conduit member 224 includes a horizontal passage there through. As such, the internal fluid flow passage through the second and third conduit members 224, 255 includes one vertical section and one horizontal section. In this embodiment, the quick connect system 150 is set to an "OFF" position or non-operating position by completely fluidly detaching the third conduit member 255 from each of the outlet conduit members 210-213 and fluidly detaching the fluid inlet connector 205 from the second conduit member 224. In addition, the fluid inlet connector 205 and/or fluid input line 104 fluidly connected thereto may include one or more isolation valves for shutting off the flow of fluid there through when the fluid inlet connector 205 is disconnected from the second conduit member 224. Once a particular downstream fluid target location is selected for conveying fluid thereto, the quick connect system 150 may be set to an "ON" position or operating position by rotating and fluidly connecting the third conduit member 255 to the outlet conduit member corresponding to the selected downstream fluid target location. Once properly connected, the fluid inlet connector 205 may be fluidly connected to the second conduit member 224 and any isolation valves set to a "CLOSED" position may be set to an "OPEN" position allowing fluid to flow from an upstream fluid source 102 to the selected downstream fluid target location.

Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

We claim:

1. A system for routing fluid to a plurality of target locations, including:
    a first support member and a second support member set apart from the first support member;
    a fluid inlet assembly for receiving fluid from one or more upstream sources, the fluid inlet assembly including a first part mated with the first support member and a second part secured to the second support member;
    a fluid outlet assembly including a plurality of fluid outlet connections wherein each fluid outlet connection is fluidly communicated with a different one of the plurality of target locations; and
    a swivel connector secured to the second support member; wherein the swivel connector is operationally configured to direct the second part of the fluid inlet assembly between (1) a position of fluid communication with the first part of the fluid inlet assembly and one of the plurality of fluid outlet connections and (2) one or more non-communicated positions apart from the first part of the fluid inlet assembly and the plurality of fluid outlet connections.

2. The system of claim 1 wherein the second part of the fluid inlet assembly includes a moveable fluid pathway.

3. The system of claim 2 wherein the swivel connector is operationally configured to swivel the moveable fluid pathway along a 360.0 degree rotation.

4. The system of claim 3 wherein the moveable fluid pathway includes a fluid outlet fluidly communicable with a fluid inlet of each of the fluid outlet connections and wherein each of the fluid outlet connections are oriented along an arc corresponding to the 360.0 degree rotation of the fluid outlet.

5. The system of claim 1 including a portable framework including the first support member including (1) a bottommost section and (2) a floor spaced apart from the bottommost section.

6. The system of claim 5 wherein the first part of the fluid inlet assembly and each of the fluid outlet connections are rotatably attached to the first support member and wherein each of the fluid outlet connections includes an internal fluid flow passage located between the first support member and the second support member.

7. The system of claim 5 wherein the fluid inlet assembly includes the first part rotatably attached to the first support member and the second part rotatably attached to the second support member, and wherein rotation of the first part is independent of rotation of the second part.

8. The system of claim 5 wherein the first support member includes fork lift pockets and the bottommost section is operationally configured to be set atop a support surface at a work site, wherein the system is operationally configured to be moved from a first location of operation on a support surface at a work site to a second location of operation on the support surface.

9. The system of claim 5 wherein the floor of the first support member includes a plurality of openings, each opening including a turnable seat therein.

10. The system of claim 1 wherein the first part of the fluid inlet assembly is operationally configured to divert the flow of fluid there through 90.0 degrees.

11. The system of claim 1 wherein the swivel connector includes a vertical lift system operationally configured to direct the second part of the fluid inlet assembly linearly to and from the first part of the fluid inlet assembly.

12. A fluid delivery system, including:
an upstream fluid source;
a plurality of downstream target fluid delivery locations; and
a fluid routing system having a box type framework including a first support member and a second support member spaced apart from the first support member via a plurality of vertical support members, a fluid inlet assembly including a first assembly including a fluid inlet in fluid communication with the upstream fluid source, a second assembly secured to the second support member, and a plurality of fluid outlets in fluid communication with the plurality of downstream target fluid delivery locations, each fluid outlet corresponding to a different one of the plurality of downstream target fluid delivery locations;
the second assembly having a swiveling fluid conduit operationally configured to be directed between a disengagement position wherein the swiveling fluid conduit is disconnected from the first assembly and each of the fluid outlets and an engagement position wherein the swiveling fluid conduit is connected to the first assembly and a particular fluid outlet of the plurality of fluid outlets in a manner effective for fluid flow from the upstream fluid source to one of the downstream target fluid delivery locations corresponding to the particular fluid outlet.

13. The system of claim 12 wherein the fluid routing system is portable.

14. The system of claim 12 wherein the upstream fluid source is a high pressure fluid source and the fluid inlet assembly includes a plurality of crossover flanges, each crossover flange having a working pressure up to about 137.9 MPa (20,000.0 psi).

15. The system of claim 12 wherein the swiveling fluid conduit is rotatable 360.0 degrees.

16. The fluid delivery system of claim 12 wherein the first support member includes a work platform for personnel to operate the fluid routing system and a roof operationally configured to provide cover for personnel on the work platform.

17. A single line hydraulic fracturing system for stimulating a plurality of wells of a multi-well site, including:
an upstream fluid line in fluid communication with a source of high pressure fluid, wherein the upstream fluid line includes steel pipe with an inner diameter from about 5.08 cm to about 25.4 cm and a wall thickness sufficient to sustain continuous delivery of fluid at pressures up to 137.9 MPa (20,000.0 psi);
a plurality of downstream fluid lines, each downstream fluid line corresponding to a particular well of the plurality of wells; and
a fluid routing system in fluid communication with (1) the upstream fluid line and (2) the plurality of downstream fluid lines;
the fluid routing system having a plurality of fluid outlets, each fluid outlet being fluidly communicated with a different one of the plurality of downstream fluid lines; and
the fluid routing system having a swiveling fluid line for selective fluid communication with one of the plurality of fluid outlets for routing high pressure fluid to a single well of the plurality of wells;
wherein the swiveling fluid line is operationally configured to be directed between a first position fluidly disconnected from the upstream fluid line and the plurality of fluid outlets and a second position fluidly connected to the upstream fluid line and one of the plurality of fluid outlets.

18. The system of claim 17 wherein the fluid routing system includes a portable work platform operationally configured to receive each of the plurality of fluid outlets in rotatable attachment thereto, the portable work platform including rail members operationally configured as attachment surfaces for a winch system.

19. The system of claim 18 wherein the portable work platform has a non-slip surface and at least one drain operationally configured to remove captured fluid from the fluid routing system.

* * * * *